(12) United States Patent
Xu et al.

(10) Patent No.: US 10,346,986 B2
(45) Date of Patent: Jul. 9, 2019

(54) SYSTEM AND METHODS FOR IMAGE SEGMENTATION USING CONVOLUTIONAL NEURAL NETWORK

(71) Applicant: Elekta, Inc., Atlanta, GA (US)

(72) Inventors: Jiaofeng Xu, Saint Louis, MO (US); Xiao Han, Chesterfield, MO (US)

(73) Assignee: Elekta, Inc., Atlanta, GA (US)

( * ) Notice: Subject to any disclaimer, the term of this patent is extended or adjusted under 35 U.S.C. 154(b) by 0 days.

(21) Appl. No.: 16/161,796

(22) Filed: Oct. 16, 2018

(65) Prior Publication Data

US 2019/0050992 A1 Feb. 14, 2019

Related U.S. Application Data

(63) Continuation of application No. 15/935,077, filed on Mar. 26, 2018, now Pat. No. 10,134,141, which is a
(Continued)

(51) Int. Cl.
*G06K 9/00* (2006.01)
*G06T 7/11* (2017.01)
(Continued)

(52) U.S. Cl.
CPC .................. *G06T 7/11* (2017.01); *G06N 3/04* (2013.01); *G06N 3/0454* (2013.01); *G06N 3/084* (2013.01);
(Continued)

(58) Field of Classification Search
None
See application file for complete search history.

(56) References Cited

U.S. PATENT DOCUMENTS 8,369,598 B2 *  2/2013  Gupta ................... G06T 7/0012
                                                                   382/131
8,390,648 B2    3/2013  Ptucha et al.
(Continued)

FOREIGN PATENT DOCUMENTS

EP          3032445 A2      6/2016
WO     WO-2018039380 A1    3/2018

OTHER PUBLICATIONS

"U.S. Appl. No. 15/248,628, Non Final Office Action dated Sep. 28, 2017", 7 pgs.
(Continued)

*Primary Examiner* — Atiba O Fitzpatrick
(74) *Attorney, Agent, or Firm* — Schwegman Lundberg & Woessner, P.A.; Sanjay Agrawal

(57) ABSTRACT

The present disclosure relates to systems, methods, devices, and non-transitory computer-readable storage medium for segmenting three-dimensional images. In one implementation, a computer-implemented method for segmenting a three-dimensional image is provided. The method may include receiving the three-dimensional image acquired by an imaging device, and creating a first stack of two-dimensional images from a first plane of the three-dimensional image and a second stack of two-dimensional images from a second plane of the three-dimensional image. The method may further include segmenting, by a processor, the first stack and the second stack of two-dimensional images using at least one neural network model. The method may also include determining, by the processor, a label map for the three-dimensional image by aggregating the segmentation results from the first stack and second stack.

20 Claims, 10 Drawing Sheets

Related U.S. Application Data continuation of application No. 15/248,628, filed on Aug. 26, 2016, now Pat. No. 9,965,863.

(51) Int. Cl.
*G06N 3/04* (2006.01)
*G06T 7/00* (2017.01)
*G06T 7/174* (2017.01)
*G06N 3/08* (2006.01)

(52) U.S. Cl.
CPC .......... *G06T 7/0012* (2013.01); *G06T 7/174* (2017.01); *G06T 2207/10012* (2013.01); *G06T 2207/10072* (2013.01); *G06T 2207/20084* (2013.01); *G06T 2207/20221* (2013.01); *G06T 2207/30028* (2013.01); *G06T 2207/30081* (2013.01); *G06T 2207/30096* (2013.01)

(56) References Cited

U.S. PATENT DOCUMENTS

| | | |
|---|---|---|
| 8,395,978 B2 | 3/2013 | Hwang et al. |
| 8,977,629 B2 | 3/2015 | Goswami et al. |
| 9,202,144 B2 | 12/2015 | Wang et al. |
| 9,319,640 B2 | 4/2016 | Ptucha et al. |
| 9,354,778 B2 | 5/2016 | Cornaby et al. |
| 9,368,110 B1 | 6/2016 | Hershey et al. |
| 9,965,863 B2 | 5/2018 | Xu et al. |
| 10,134,141 B2 | 11/2018 | Xu |
| 2005/0251021 A1 | 11/2005 | Kaufman et al. |
| 2010/0177190 A1* | 7/2010 | Chiang ............... G02B 21/006 348/79 |
| 2010/0183217 A1 | 7/2010 | Seung et al. |
| 2011/0157218 A1 | 6/2011 | Ptucha et al. |
| 2011/0206260 A1* | 8/2011 | Bergmans ........... G01R 33/543 382/131 |
| 2013/0259345 A1* | 10/2013 | El-Baz ................ G06T 7/0012 382/131 |
| 2015/0339570 A1 | 11/2015 | Scheffler |
| 2015/0371085 A1 | 12/2015 | Hudson et al. |
| 2016/0055237 A1 | 2/2016 | Tuzel et al. |
| 2016/0171311 A1 | 6/2016 | Case et al. |
| 2016/0171707 A1 | 6/2016 | Schwartz |
| 2016/0171708 A1 | 6/2016 | Kim et al. |
| 2016/0180195 A1 | 6/2016 | Martinson et al. |
| 2016/0184566 A1 | 6/2016 | Ibrahim et al. |
| 2017/0109881 A1* | 4/2017 | Avendi ................ G06T 7/0012 |
| 2018/0061059 A1 | 3/2018 | Xu et al. |
| 2018/0218503 A1 | 8/2018 | Xu et al. |

OTHER PUBLICATIONS

"U.S. Appl. No. 15/248,628, Notice of Allowance dated Jan. 29, 2018", 7 pgs.
"U.S. Appl. No. 15/248,628, Response filed Nov. 28, 2017 to Non Final Office Action dated Sep. 28, 2017", 10 pgs.
"U.S. Appl. No. 15/935,077, Non Final Office Action dated May 3, 2018", 6 pgs.
"U.S. Appl. No. 15/935,077, Notice of Allowance dated Aug. 31, 18", 7 pgs.
"U.S. Appl. No. 15/935,077, Preliminary Amendment filed Mar. 26, 2018", 8 pgs.
"U.S. Appl. No. 15/935,077, Response filed Jul. 26, 2018 to Non Final Office Action dated May 3, 2018", 9 pgs.
"International Application Serial No. PCT/US2017/048245, International Search Report dated Oct. 10, 2017", 2 pgs.
"International Application Serial No. PCT/US2017/048245, Written Opinion dated Oct. 10, 2017", 7 pgs.
"International Application Serial No. PCT/US2017/048271, International Search Report dated Nov. 28, 2017", 4 pgs.
"International Application Serial No. PCT/US2017/048271, Written Opinion dated Nov. 28, 2017", 9 pgs.
Badrinarayanan, Vijay, et al., "SegNet: A Deep Convolutional Encoder-Decoder Architecture for Image Segmentation", arXiv:1511.00561v3 [cs.CV] Oct. 10, 2016, (2016), 1-14.
Chen, Hao, et al., "Automatic Localization and Identification of Vertebrae in Spine CT via a Joint Learning Model with Deep Neural Networks", Medical Image Computing and Computer-Assisted Intervention—MICCAI 2015, LNCS 9349, (2015), 515-522.
Chevrefils, Claudia, et al., "Quantitative evaluation of an automatic segmentation method for 3D reconstruction of intervertebral scoliotic disks from MR images", BMC Medical Imaging, 12(1), (2012), 14 pgs.
Holger, Roth, et al., "Deep Organ: Multi-level Deep Convolutional Networks for Automated Pancreas Segmentation", arXiv:1506.06448v1, (Jun. 2015), 1-12.
Hyeonwoo, Noh, et al., "Learning Deconvolution Network for Semantic Segmentation", Computer Vision Foundation, 1520-1528.
Jonathan, Long, et al., "Fully Convolutional Networks for Semantic Segmentation", 1-10.
Kenny, Cha, et al., "Urinary bladder segmentation in CT urography using deep-learning convolutional neural network and level sets", Medical Physics vol. 43, No. 4, (Apr. 2016), 1881-1896.
Krizhevsky, A, et al., "ImageNet Classification with Deep Convolutional Neural Networks", Proceedings of the Neural Information Processing Systems Conference (NPIS 2012), in Advances in Neural Information Processing Systems 25., [Online] retrieved from the internet:https://papers.nips.cc/paper/4824-imagenet-classification-with deep-convolutional-neural-networks.pdf, 9 pgs.
Lai, M, et al., "Deep Learning for Medical Image Segmentation", [Online] retrieved from the internet:http://arxiv.org/pdf/1505.02000v1.pdf, (Apr. 29, 2016), 23 pgs.
Ronneberger, Olaf, et al., "U-net: Convolutional networks for biomedical image segmentation", International Conference on Medical image computing and computer-assisted intervention. Springer, Cham, (2015), 1-8.
Setio, Arnaud A. A., et al., "Pulmonary Nodule Detection in CT Images: False Positive Reduction Using Multi-View Convolutional Networks", IEEE Transactions on Medical Imaging, 35(5), (May 2016), 1160-1169.
Shin, Hoo-Chang, et al., "Deep Convolutional Neural Networks for Computer-Aided Detection: CNN Architectures, Dataset Characteristics and Transfer Learning", IEEE Transactions on Medical Imaging, 35(5), (May 2016), 1285-1298.
U.S. Appl. No. 15/248,628 U.S. Pat. No. 9,965,863, filed Aug. 26, 2016, System and Methods for Image Segmentation Using Convolutional Neural Network.
U.S. Appl. No. 15/935,077, filed Mar. 26, 2018, System and Methods for Image Segmentation Using Convolutional Neural Network.
"International Application Serial No. PCT/US2017/048271, International Preliminary Report on Patentability dated Mar. 7, 2019", 11 pgs.

* cited by examiner

US 10,346,986 B2

SYSTEM AND METHODS FOR IMAGE SEGMENTATION USING CONVOLUTIONAL NEURAL NETWORK

CLAIM OF PRIORITY

This application is a continuation of U.S. application Ser. No. 15/935,077, filed Mar. 26, 2018, which is a continuation of U.S. application Ser. No. 15/248,628, filed Aug. 26, 2016, the benefit of priority of each of which is claimed hereby, and each of which are incorporated by reference herein in their entireties.

TECHNICAL FIELD

This disclosure relates generally to image segmentation. More specifically, this disclosure relates to systems and methods for automated image segmentation based on neural networks.

BACKGROUND

In radiotherapy or radiosurgery, treatment planning is typically performed based on medical images of a patient and requires the delineation of target volumes and normal critical organs in the medical images. Thus, segmentation of anatomical structures in medical images is a prerequisite and important step for radiotherapy treatment planning. Accurate and automatic computer-based segmentation or contouring of anatomical structures can facilitate the design and/or adaptation of an optimal treatment plan. However, accurate and automatic segmentation of medical images currently remains a challenging task because of deformation and variability of the shapes, sizes, positions, etc. of the target volumes and critical organs in different patients.

FIG. 1 illustrates an exemplary three-dimensional (3D) computed tomography (CT) image from a typical prostate cancer patient. Illustration (A) shows a pelvic region of the patient in a 3D view, which includes the patient's bladder, prostate, and rectum. Images (B), (C), and (D) are axial, sagittal, and coronal views from a 3D CT image of this pelvic region. As shown in images (B), (C), and (D), most part of the patient's prostate boundary is not visible. That is, one cannot readily distinguish the prostate from other anatomical structures or determine a contour for the prostate. In comparison, images (E), (F), and (G) show the expected prostate contour on the same 3D CT image. As illustrated in FIG. 1, conventional image segmentation methods solely based on contrast and textures presented in the image would likely fail when used to segment this exemplary 3D CT image. Thus, various approaches are proposed to improve the accuracy of automatic segmentation of medical images.

For example, atlas-based auto-segmentation (ABAS) methods have been used to tackle the problem of contouring anatomical structures in radiotherapy treatment planning. ABAS methods map contours in a new image based on a previously defined anatomy configuration in a reference image, i.e., the atlas. The accuracy of ABAS methods largely depends on the performance of atlas registration methods. As discussed above, the shapes and sizes of some organs may vary for different patients, and may be deformed in large scales at different stages for the same patient, which may decrease the registration accuracy and affect the automatic segmentation performed by ABAS methods.

Recent developments in machine learning techniques make improved image segmentation, such as more accurate segmentation of low-contrast parts in images or lower quality images. For example, various machine learning algorithms can "train" the machines, computers, or computer programs to predict (e.g., by estimating the likelihood of) the anatomical structure each pixel or voxel of a medical image represents. Such prediction or estimation usually uses one or more features of the medical image as input. Therefore, the performance of the segmentation highly depends on the types of features available. For example, Random Forest (RF) method has been used for image segmentation purpose with some success. A RF model can be built based on extracting different features from a set of training samples. However, the features employed in the RF method require to be designed manually and are specific for contouring one-type of organ. It is tedious and time-consuming to design an optimal combination of features for different segmentation applications.

Accordingly, there is a need for new automatic segmentation methods to improve segmentation performance on medical images in radiation therapy or related fields.

SUMMARY

Certain embodiments of the present disclosure relate to a computer-implemented method for segmenting a three-dimensional image. The method may include receiving the three-dimensional image acquired by an imaging device, and creating a first stack of two-dimensional images from a first plane of the three-dimensional image and a second stack of two-dimensional images from a second plane of the three-dimensional image. The method may further include segmenting, by a processor, the first stack and the second stack of two-dimensional images using at least one neural network model. The method may also include determining, by the processor, a label map for the three-dimensional image by aggregating the segmentation results from the first stack and second stack.

Certain embodiments of the present disclosure relate to a device for segmenting a three-dimensional image. The device may include an input interface that receives the three-dimensional image acquired by an imaging device. The device may further include at least one storage device configured to store the three-dimensional image. The device may also include an image processor configured to create a first stack of two-dimensional images from a first plane of the three-dimensional image and a second stack of two-dimensional images from a second plane of the three-dimensional image. The image processor may be further configured to segment the first stack and the second stack of two-dimensional images using at least one neural network model. The image processor may also be configured to determine a label map for the three-dimensional image by aggregating the segmentation results from the first stack and second stack.

Certain embodiments of the present disclosure relate to a non-transitory computer-readable medium storing computer-executable instructions. When executed by at least one processor, the computer-executable instructions may cause the at least one processor to perform a method for segmenting a three-dimensional image. The method may include receiving the three-dimensional image acquired by an imaging device, and creating a first stack of two-dimensional images from a first plane of the three-dimensional image and a second stack of two-dimensional images from a second plane of the three-dimensional image. The method may further include segmenting, by the processor, the first stack and the second stack of two-dimensional images using at least one neural network model. The method may also include determining, by the processor, a label map for the three-dimensional image by aggregating the segmentation results from the first stack and second stack.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles.

DETAILED DESCRIPTION

Figure 1:
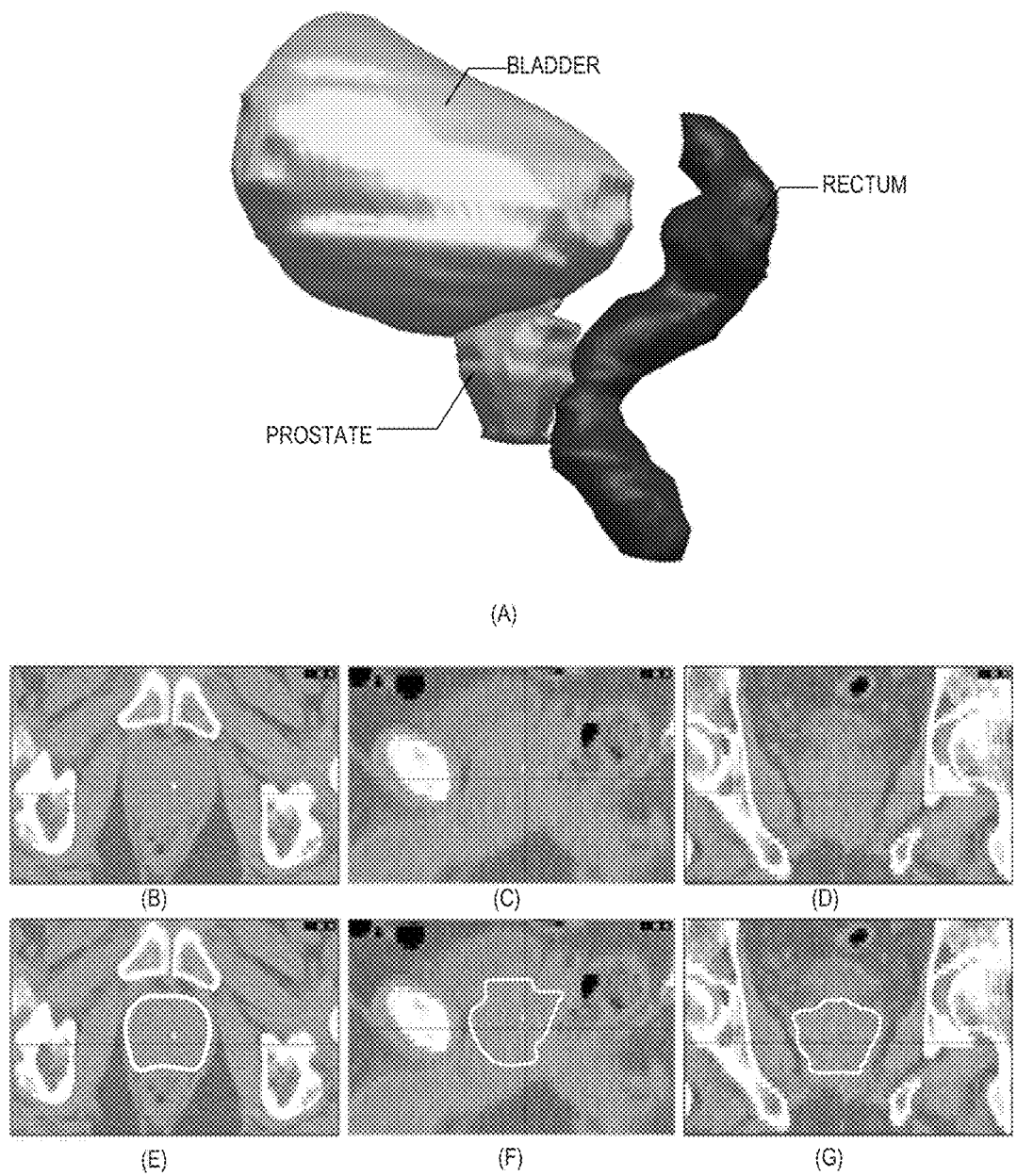
FIG. 1 illustrates an exemplary three-dimensional CT image from a typical prostate cancer patient.

Systems, methods, devices, and processes consistent with the present disclosure are directed to segmenting a 3D image using image segmentation methods based on machine learning algorithms. Advantageously, the exemplary embodiments allow for improving the accuracy and robustness of segmenting a 3D image using dependent structure information of stacks of adjacent 2D images obtained from the 3D image.

As used herein, a "3D medical image" or a "3D image" to be segmented or used as training data may refer to a 3D image dataset acquired by any type of imaging modalities, such as CT, magnetic resonance imaging (MRI), functional MRI (e.g., fMRI, DCE-MRI, and diffusion MRI), cone beam computed tomography (CBCT), Spiral CT, positron emission tomography (PET), single-photon emission computed tomography (SPECT), X-ray, optical tomography, fluorescence imaging, ultrasound imaging, and radiotherapy portal imaging, etc. Additionally, as used herein, a "machine learning algorithm" refers to any algorithm that can learn a model or a pattern based on existing information or knowledge, and predict or estimate output using input of new information or knowledge.

Supervised learning is a branch of machine learning that infers a predication model given a set of training data. Each individual sample of the training data is a pair containing a dataset (e.g., an image) and a desired output value or dataset. A supervised learning algorithm analyzes the training data and produces a predictor function. The predictor function, once derived through training, is capable of reasonably predicting or estimating the correct output value or dataset for a valid input. The predictor function may be formulated based on various machine learning models, algorithms, and/or processes.

Convolutional neural network (CNN) is a type of machine learning algorithm that can be trained by supervised learning. The architecture of a CNN model includes a stack of distinct layers that transform the input into the output. Examples of the different layers may include one or more convolutional layers, non-linear operator layers (such as rectified linear units (ReLu) functions, sigmoid functions, or hyperbolic tangent functions), pooling or subsampling layers, fully connected layers, and/or final loss layers. Each layer may connect one upstream layer and one downstream layer. The input may be considered as an input layer, and the output may be considered as the final output layer.

To increase the performance and learning capabilities of CNN models, the number of different layers can be selectively increased. The number of intermediate distinct layers from the input layer to the output layer can become very large, thereby increasing the complexity of the architecture of the CNN model. CNN models with a large number of intermediate layers are referred to as deep CNN models. For example, some deep CNN models may include more than 20 to 30 layers, and other deep CNN models may even include more than a few hundred layers. Examples of deep CNN models include AlexNet, VGGNet, GoogLeNet, ResNet, etc.

The present disclosure employs the powerful learning capabilities of CNN models, and particularly deep CNN models, for segmenting anatomical structures of 3D images. Consistent with the disclosed embodiments, segmentation of a 3D image is performed using a trained CNN model to label each voxel of an input 3D image with an anatomical structure. Advantageously, the CNN model for image segmentation in the embodiments of the present disclosure allows for automatic segmentation of anatomical structures without the need of manual feature extraction.

As used herein, a CNN model used by the disclosed segmentation method may refer to any neural network model formulated, adapted, or modified based on a framework of convolutional neural network. For example, a CNN model used for segmentation in embodiments of the present disclosure may selectively include intermediate layers between the input and output layers, such as one or more deconvolution layers, up-sampling or up-pooling layers, pixel-wise predicting layers, and/or copy and crop operator layers.

The disclosed image segmentation methods, systems, devices, and processes generally include two stages: a training stage that "trains" or "learns" a CNN model using training datasets that include 3D images labelled with different anatomical structures for each voxel, and a segmentation stage that uses the trained CNN model to predict the anatomical structure of each voxel of an input 3D image and/or label each voxel of an input 3D image to an anatomical structure.

As used herein, "training" a CNN model refers to determining one or more parameters of at least one layer in the CNN model. For example, a convolutional layer of a CNN model may include at least one filter or kernel. One or more parameters, such as kernel weights, size, shape, and structure, of the at least one filter may be determined by e.g., a backpropagation-based training process.

Consistent with the disclosed embodiments, to train a CNN model, the training process uses at least one set of training images. Each set of training images may include a 3D image and its corresponding 3D ground truth label map that associates an anatomical structure to each of the voxels of the 3D image. As a non-limiting example, a 3D image may be divided to sequential stacks of adjacent 2D images, and the 3D ground truth label map consists of sequential 2D ground truth label maps, respectively corresponding to the sequential stacks of adjacent 2D images. As used herein, a training image is an already segmented image and a ground truth label map provides a known anatomical structure label for each pixel of a representative image slice of the training image. In other words, pixels of the ground truth label map are associated with known anatomical structures. If the stack of adjacent 2D images includes an odd number of images, the ground truth label map provides structure labels of the middle image of the stack. Alternatively, if the stack of adjacent 2D images includes an even number of images, the ground truth label map provides structure labels of one of the two middle images of the stack.

Consistent with the disclosed embodiments, a stack of adjacent 2D images are adjacent 2D image slices along a selected anatomical plane, such as an axial plane, a sagittal plane, or a coronal plane. Thus, the anatomical structures in the adjacent 2D images are spatially dependent, correlated, or continuous along an axis orthogonal to the anatomical plane. Advantageously, such dependent structure information between the adjacent 2D images are used by the disclosed image segmentation methods to improve the robustness and accuracy of the segmentation results of 3D medical images.

Consistent with the disclosed embodiments, stacks of adjacent 2D images along different anatomical planes are used for training different CNN models. As a non-limiting example, three different sets of training images, each including a set of stacks of adjacent 2D images along an anatomical plane, such as the axial plane, sagittal plane, and coronal plane, are used for training three CNN models respectively. Each trained CNN model can be used to segment a 3D image using stacks of adjacent 2D images obtained from the 3D image along the corresponding anatomical plane. Alternatively, stacks of adjacent 2D images along the three different anatomical planes are combined for training one CNN model. The trained CNN model can be used to segment a 3D image using stacks of adjacent 2D images obtained from the 3D image along any of the three anatomical planes.

Consistent with the disclosed embodiments, at least one trained CNN model is used for segmenting a 3D image. As a non-limiting example, a 3D image may be divided into or provided in the form of a plurality of adjacent 2D images. For example, a series of stacks of adjacent 2D images along an anatomical plane may be obtained from a 3D image to be segmented. The series of stacks of adjacent 2D images may be sequential and have one or more overlapping images, such that the middle images of the stacks together substantially constitute the whole 3D image. Each stack in the series is input to a trained CNN model to determine a 2D output label map of the middle image in the stack. Based on the 2D label maps of the middle images of the stacks of 2D adjacent images, a 3D label map may be determined. As a non-limiting example, a 3D label map may be obtained by aggregating the 2D label maps of the middle images according to the sequence of the middle images along an axis orthogonal to the anatomical plane of the stacks of adjacent 2D images.

As described above, series of stacks of adjacent 2D images along different anatomical planes, such as an axial plane, a sagittal plane, or a coronal plane, may be obtained from a 3D image. In such instances, three 3D label maps may be determined based on three series of stacks of adjacent 2D images of three anatomical planes respectively. As a non-limiting example, three 3D label maps may be determined by three different trained CNN models using three series of stacks of adjacent 2D images of the three different anatomical planes respectively. As another non-limiting example, three 3D label maps may be determined by one trained CNN model using three series of stacks of adjacent 2D images of the three different anatomical planes respectively. The three determined 3D label maps can be fused to determine a final 3D label map of the 3D image.

Consistent with the disclosed embodiments, the determined 3D label map associates an anatomic structure to each voxel of the 3D image. As a non-limiting example, the 3D label map predicts the anatomical structure each voxel of the 3D image represents.

The disclosed image segmentation systems, methods, devices, and processes can be applied to segmenting 3D images obtained from any type of imaging modalities, including, but not limited to X-ray, CT, CBCT, spiral CT, MRI, functional MRI (e.g., fMRI, DCE-MRI and diffusion MRI), PET, SPECT, optical tomography, fluorescence imaging, ultrasound imaging, and radiotherapy portal imaging, etc. Furthermore, the disclosed image segmentation systems, methods, devices, and processes can be used to segment both 2D and 3D images.

Figure 2:
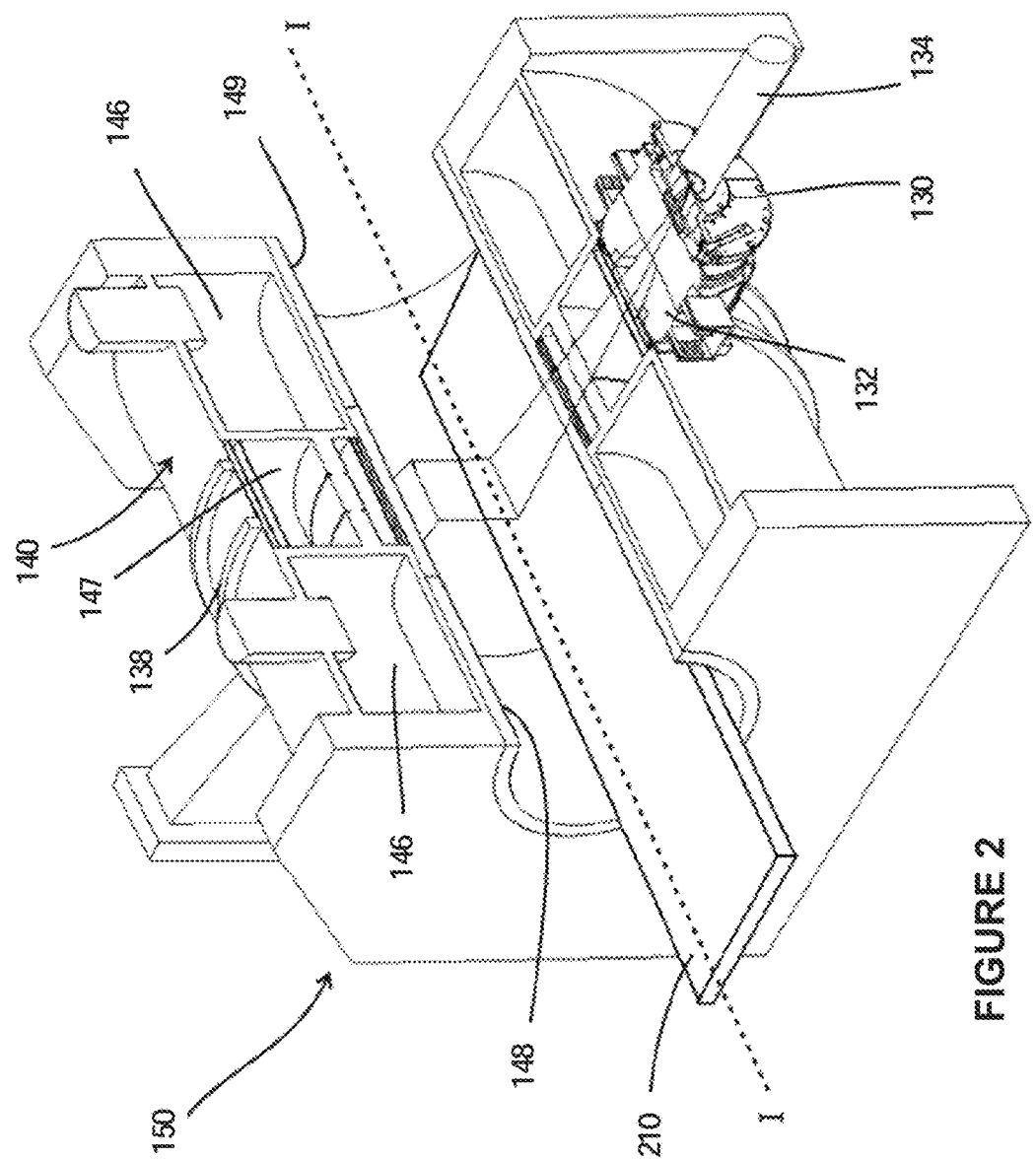
FIG. 2 illustrates an exemplary image-guided radiotherapy device, according to some embodiments of the present disclosure.

Consistent with some embodiments, the disclosed image segmentation systems may be part of a radiotherapy device as described with reference to FIG. 2. FIG. 2 illustrates an exemplary image-guided radiotherapy device 150, according to some embodiments of the present disclosure. Device 150 includes a couch 210, an image acquisition portion corresponding to image acquisition device 140, and a radiation delivery portion corresponding to radiotherapy device 130.

Couch 210 may be used for supporting a patient (not shown) during a treatment session, and may also be referred to as a patient supporting system. Couch 210 may be movable along a horizontal, translation axis (labelled "I"), such that the patient resting on couch 210 can be moved into and/or out of device 150. In some embodiments, couch 210 may be rotatable around a central vertical axis of rotation, transverse to the translation axis. Couch 210 may be motorized to move in various directions and rotate along various axes to properly position the patient according to a treatment plan.

Image acquisition device 140 may include an MRI machine used to acquire 2D or 3D MRI images of a patient before, during, and/or after a treatment session. Image acquisition device 140 may include a magnet 146 for generating a primary magnetic field for magnetic resonance imaging. The magnetic field lines generated by operation of magnet 146 may run substantially parallel to the central translation axis I. Magnet 146 may include one or more coils with an axis that runs parallel to the translation axis I. In some embodiments, the one or more coils in magnet 146 may be spaced such that a central window 147 of magnet 146 is free of coils. In other embodiments, the coils in magnet 146 may be thin enough or of a reduced density such that they are substantially transparent to radiation of the wavelength generated by radiotherapy device 130. Image acquisition device 140 may also include one or more active shielding coils, which may generate a magnetic field outside magnet 146 of approximately equal magnitude and opposite polarity to cancel the magnetic field outside magnet 146. A radiation source 134 of radiotherapy device 130 may be positioned in the region where the magnetic field is cancelled, at least to a first order.

Image acquisition device 140 may also include two gradient coils 148 and 149, which may generate a gradient magnetic field that is superposed on the primary magnetic field. Coils 148 and 149 may generate a gradient in the resultant magnetic field that allows spatial encoding of the protons so that their position can be determined. Gradient coils 148 and 149 may be positioned around a common central axis with the magnet 146, and may be displaced from on another along that central axis. The displacement may create a gap, or window, between coils 148 and 149. In the embodiments wherein magnet 146 also includes a central window 147 between coils, the two windows may be aligned with each other.

It is contemplated that image acquisition device 140 may be an imaging device other than MRI, such as X-ray, CT, CBCT, spiral CT, PET, SPECT, optical tomography, fluorescence imaging, ultrasound imaging, and radiotherapy portal imaging device, etc.

Radiotherapy device 130 may include the source of radiation 134, such as an X-ray source or a linear accelerator, and a multi-leaf collimator (MLC) 132. Radiotherapy device 130 may be mounted on a chassis 138. Chassis 138 may be continuously rotatable around couch 210 when it is inserted into the treatment area, powered by one or more chassis motors. A radiation detector may also be mounted on chassis 138 if desired, preferably opposite to radiation source 134 and with the rotational axis of chassis 138 positioned between radiation source 134 and the detector. The control circuitry of radiotherapy device 130 may be integrated within device 150 or remote from it.

During a radiotherapy treatment session, a patient may be positioned on couch 210, which may be inserted into the treatment area defined by magnetic coils 146, 148, 149, and chassis 138. Control console 110 may control radiation source 134, MLC 132, and the chassis motor(s) to deliver radiation to the patient through the window between coils 148 and 149.

CNN Model for 3D Image Segmentation

Figure 3:
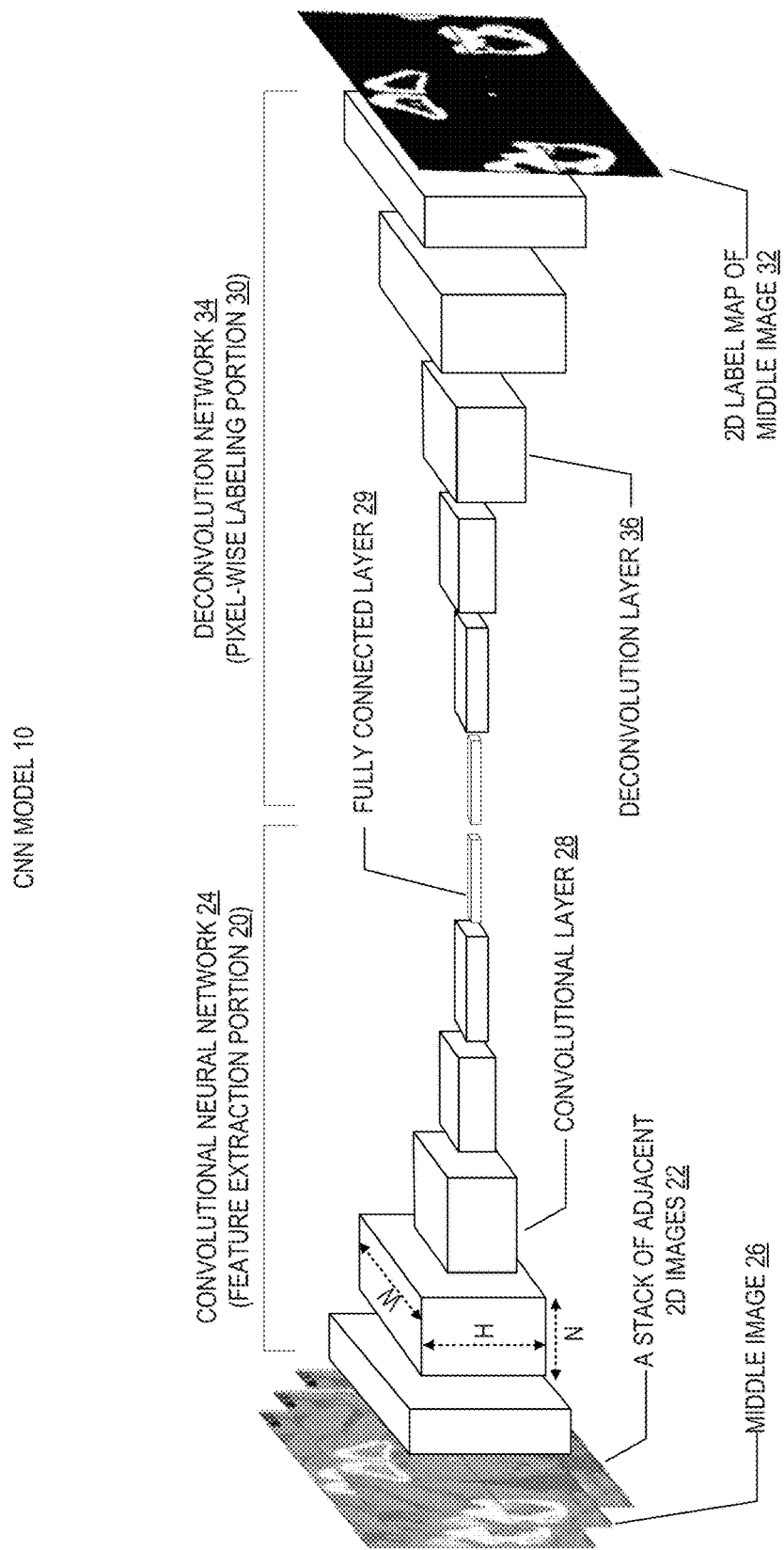
FIG. 3 illustrates an exemplary convolutional neural network (CNN) model for image segmentation, according to some embodiments of the present disclosure.

FIG. 3 illustrates an exemplary CNN model for image segmentation, according to some embodiments of the present disclosure. As shown in FIG. 3, a CNN model for image segmentation may receive a stack of adjacent 2D images as input and outputs a predicted 2D label map of one of the images in the middle of the stack. As described above, if the stack of adjacent 2D images includes an odd number of images, the 2D label map provides structure labels of the middle image of the stack. Alternatively, if the stack of adjacent 2D images includes an even number of images, the 2D label map provides structure labels of one of the two middle images of the stack.

As shown in FIG. 3, a CNN model 10 may generally include two portions: a first feature extraction portion 20 and a second pixel-wise labeling portion 30. Feature extraction portion 20 may extract one or more features of an input stack of adjacent 2D images 22. The feature extraction portion uses a convolutional neural network 24 to receive input stack of adjacent 2D images 22 and to output at least one feature vector or matrix representing the features of the input stack. The pixel-wise labeling portion 30 uses the output of feature extraction portion 20 to predict a 2D label map 32 of middle image 26 of input stack of adjacent 2D images 22. Pixel-wise labeling portion 30 may be performed using any suitable approach, such as a patch-based approach and a fully mapped approach, as described in detail further below.

Advantageously, the use of a stack of adjacent 2D images that contain dependent structure information both for training and as the input of CNN model 10 improves the accuracy of the prediction of output 2D label map 32 by CNN model 10. This further improves the accuracy of the predicted 3D label map of a 3D image constructed from 2D label maps predicted for each image slice of the 3D image.

As used herein, the dependent structure information may refer to a spatially dependent relationship between the anatomical structures shown in the stack of adjacent 2D images along the axis orthogonal to the anatomical plane of the 2D images. As a non-limiting example, the shape and type of an anatomical structure represented by a first set of pixels in a first image of the stack may also be represented by a second set of pixels in a second image adjacent to the first image. This is because the spatial neighbouring of the first and second images along the axis orthogonal to the anatomical plane allows for some dependency or continuity of the anatomical structures shown in these images. Therefore, the shape, size, and/or type of an anatomical structure in one image may provide information of the shape, size, and/or type of the anatomical structure in another adjacent image along the same plane.

As another non-limiting example, when the stack of adjacent 2D images includes three sequential images, e.g., first, second, and third image slices stacked in sequence, an anatomical structure may be shown in both a first set of pixels in the first image slice of the stack and a third set of pixels in a third image slice of the stack, but not in a corresponding second set of pixels (e.g., pixels having similar spatial locations as those of the first and/or third set of pixels) of the second image slice that is between and adjacent to the first and third image slices. In such instances, the corresponding pixels in the second image slice may be incorrectly labeled. Such discontinuity of the anatomical structure in the stack of three adjacent 2D image slices can be used as dependent structure information for training CNN model 10.

As another non-limiting example, in a stack of three adjacent 2D images, e.g., first, second, and third image slices stacked in sequence, both a first set of pixels in the first image slice of the stack and a third set of pixels in the third image slice may indicate the background, but a corresponding second set of pixels of the second image slice between and adjacent to the first and third image slices may indicate an anatomical structure. The corresponding pixels in the second image slice may be subject to noise that generates a false positive signal. Such discontinuity of the background in the stack of three adjacent 2D image slices may also be used as dependent structure information for training CNN model 10.

Different types of dependent structure information may be selectively used based on various factors, such as the number of adjacent images in the stack, the types, shapes, sizes, positions, and/or numbers of the anatomical structures to be segmented, and/or the imaging modality used for obtaining the images. As described above, the use of such dependent structure information of stacks of adjacent 2D images obtained from a 3D image improves the accuracy for segmenting the 3D image or generating a 3D label map.

Various components and features of CNN model 10 used in the embodiments of the present disclosure are described in detail below.

Convolutional Neural Network for Feature Extraction

In some embodiments, convolutional neural network 24 of the CNN model 10 includes an input layer, e.g., stack of adjacent 2D images 22. Because a stack of adjacent 2D images are used as the input, the input layer has a volume, whose spatial dimensions are determined by the width and height of the 2D images, and whose depth is determined by the number of images in the stack. As described herein, the depth of the input layer of CNN model 10 can be desirably adjusted to match the number of images in input stack of adjacent 2D images 22.

In some embodiments, convolutional neural network 24 of the CNN model 10 includes one or more convolutional layers 28. Each convolutional layer 28 may have a plurality of parameters, such as the width ("W") and height ("H") determined by the upper input layer (e.g., the size of the input of convolutional layer 28), and the number of filters or kernels ("N") in the layer and their sizes. The number of filters may be referred to as the depth of the convolutional layer. Therefore, each convolutional layer 28 may be described in terms of a 3D volume as shown in FIG. 3. The input of each convolutional layer 28 is convolved with one filter across its width and height and produces a 2D activation map or feature map corresponding to that filter. The convolution is performed for all filters of each convolutional layer, and the resulting activation maps or feature maps are stacked along the depth dimension, generating a 3D output. The output of a preceding convolutional layer can be used as input to the next convolutional layer.

In some embodiments, convolutional neural network 24 of CNN model 10 includes one or more pooling layers (not shown). A pooling layer can be added between two successive convolutional layers 28 in CNN model 10. A pooling layer operates independently on every depth slice of the input (e.g., an activation map or feature map from a previous convolutional layer), and reduces its spatial dimension by performing a form of non-linear down-sampling. As shown in FIG. 3, the function of the pooling layers is to progressively reduce the spatial dimension of the extracted activation maps or feature maps to reduce the amount of parameters and computation in the network, and hence to also control overfitting. The number and placement of the pooling layers may be determined based on various factors, such as the design of the convolutional network architecture, the size of the input, the size of convolutional layers 28, and/or application of CNN model 10.

Various non-linear functions can be used to implement the pooling layers. For example, max pooling may be used. Max pooling may partition an image slice of the input into a set of overlapping or non-overlapping sub-regions with a predetermined stride. For each sub-region, max pooling outputs the maximum. This downsamples every slice of the input along both its width and its height while the depth dimension remains unchanged. Other suitable functions may be used for implementing the pooling layers, such as average pooling or even L2-norm pooling.

In various embodiments, CNN model 10 may selectively include one or more additional layers in its convolutional neural network 24. As a non-limiting example, a ReLu layer (not shown) may be selectively added after a convolutional layer to generate an intermediate activation map or feature map. The ReLu layer may increase the nonlinear properties of the predictor function and the overall of CNN model 10 without affecting the respective dimensions of convolutional layers 28. Additionally, the ReLu layer may reduce or avoid saturation during a backpropagation training process.

As another non-limiting example, one or more fully connected layers 29 may be added after the convolutional layers and/or the pooling layers. The fully connected layers have a full connection with all activation maps or feature maps of the previous layer. For example, a fully connected layer may take the output of the last convolutional layer or the last pooling layer as the input in vector form, and perform high-level determination and output a feature vector arranged along the depth dimension. The output vector may be referred to as an output layer. The vector may contain information of the anatomical structures in input stack of images 22 of CNN model 10.

As a further non-limiting example, a loss layer (not shown) may be included in CNN model 10. The loss layer may be the last layer in convolutional neural network 24 or CNN model 10. During the training of CNN model 10, the loss layer may determine how the network training penalizes the deviation between the predicted 2D label map and the 2D ground truth label map. The loss layer may be implemented by various suitable loss functions. For example, a Softmax function may be used as the final loss layer of CNN model 10.

Pixel-Wise Labeling Approaches

As described above, in the second portion of CNN model 10, pixel-wise labeling is performed using the one or more features extracted by convolutional neural network 24 as the input to generate a predicted 2D label map 32. The 2D label map may provide structure labels of the middle images of the stack of adjacent 2D images.

In some embodiments, a patch-based approach is used for predicting 2D label map 32 of middle image 26 of input stack of adjacent 2D images 22. Each image in the stack of adjacent 2D images may be similarly divided into overlapping or non-overlapping rectangular patches, each having a central pixel. This generates a stack of adjacent 2D image patches. A stack of 2D image patches can be used as both training data and input of CNN model 10. The patches may be designed such that the central pixels of the patches together substantially constitute a whole 2D image. CNN model 10 may classify the central pixel of a middle patch of each stack of patches, e.g., predicting the anatomical structure represented by the central pixel. For example, CNN model 10 may predict a feature vector of the central pixel of the middle patch in the stack, thereby allowing for classifying the anatomical structure of the central pixel. Such classification is performed repeatedly until all central pixels of the middle patches of all stacks of adjacent 2D image patches are classified or labeled, thereby achieving segmentation of the middle image of the stack of adjacent 2D images.

In the above-described patch-based approach, pixel-wise labeling of middle image 26 of input stack of adjacent 2D images 22 is performed when all the central pixels constituting the whole middle image 26 is classified.

In other embodiments, a fully-mapped approach is used for predicting 2D label map 32 of middle image 26 of input stack of adjacent 2D images 22. In such instances, 2D label map 32 of middle image 26 is generated as the output of CNN model 10 based on input stack of adjacent 2D images 22. Convolutional neural network 24 in CNN model 10 is used for extracting an activation map or a feature map as an output, which is received by a pixel-wise labeling structure that includes one or more operation layers to predict the 2D label map. In such instances, the final layer of convolutional neural network 24 may be a convolutional layer that outputs the activation map or feature map.

As a non-limiting example, a pixel-wise prediction layer (not shown) may be added to CNN model 10 to perform the pixel-wise labeling. The pixel-wise prediction layer converts a coarse output feature map (e.g., a feature vector) of convolutional neural network 24 to a dense (e.g., providing more information of each pixel) predicted pixel-wise 2D label map 32 of middle image 26 of input stack of adjacent 2D images 22. Various functions may be used to implement the pixel-wise prediction layer, such as backwards upsampling or unpooling (e.g., bilinear or nonlinear interpolation), and backwards convolution (deconvolution).

As another non-limiting example, a deconvolution network 34 is added to CNN model 10 to perform the pixel-wise labeling. As shown in FIG. 3. Deconvolution network 34 may be a mirrored version of convolutional neural network 24 of CNN model 10. Contrary to convolutional neural network 24 that progressively reduces the spatial dimensions of the extracted activation maps or feature maps, deconvolution network 34 enlarges the intermediate activation maps or feature maps by using a selection of deconvolution layers 36 and/or unpooling layers (not shown). An unpooling layer (e.g., an upsampling layer) may be used to place the pixels in the feature maps back to their previous or original pool location, thereby generating an enlarged, yet sparse activation map or feature map. A deconvolution layer may be used to associate a single pixel of an input activation map or feature map to multiple output pixels, thereby enlarging and increasing the density of the activation map or feature map. Therefore, deconvolution network 34 may be trained and used together with convolutional neural network 24 to predict a 2D label map.

As would be appreciated by those skilled in the art, other suitable methods for performing pixel-wise labeling may be adapted, modified, and/or used in the embodiments of the present disclosure.

Consistent with embodiments of the present disclosure, the image segmentation methods, systems, devices, and/or processes based on the above-described CNN models include two stages: a training stage that "trains" or "learns" the CNN model using training datasets that include 3D images labelled with different anatomical structures for each voxel, and a segmentation stage that uses the trained CNN model to predict the anatomical structure of each voxel of an input 3D image and/or label each voxel of an input 3D medical image to an anatomical structure. The image segmentation methods, systems, devices, and/or processes based on the above-described CNN models are describe in detail below.

CNN Model-Based Image Segmentation System

Figure 4:
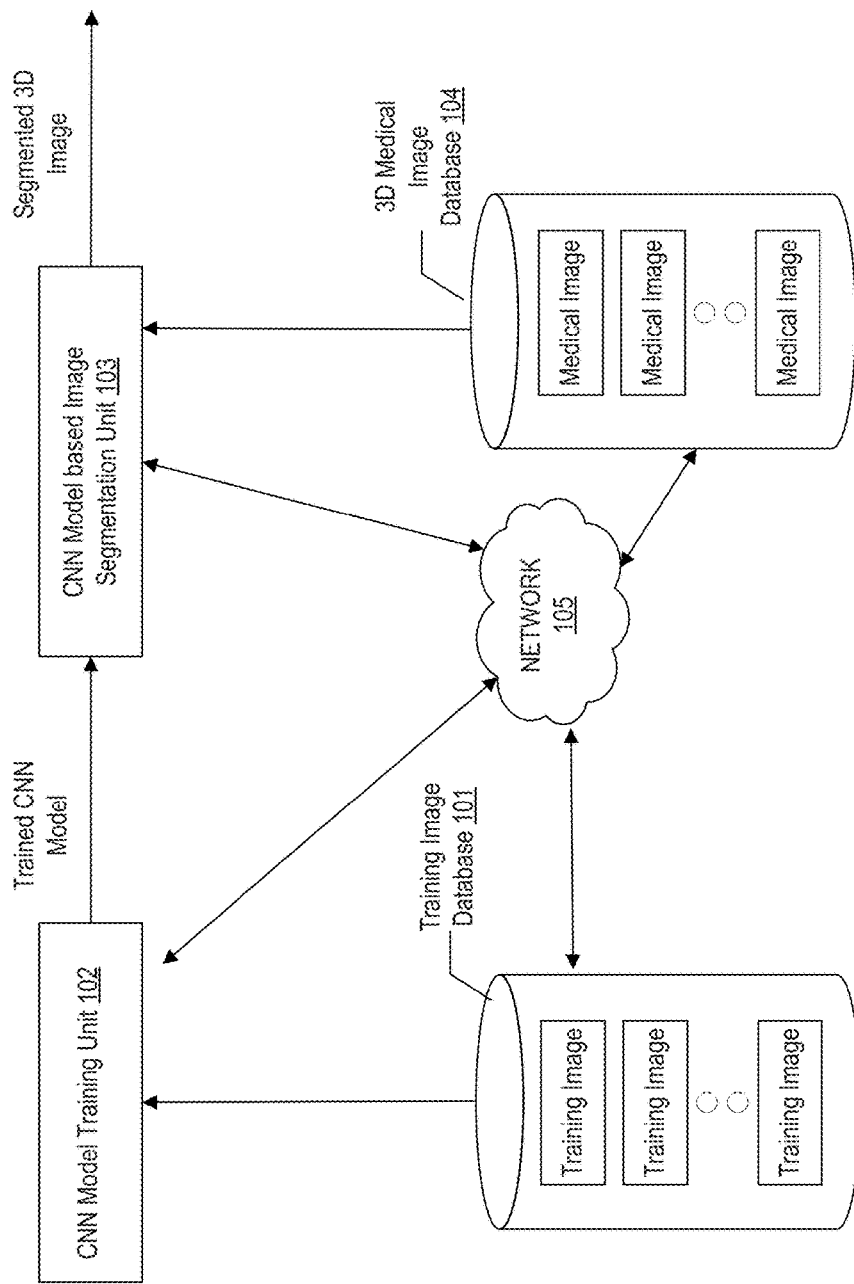
FIG. 4 illustrates an exemplary image segmentation system for segmenting 3D images, according to some embodiments of the present disclosure.

FIG. 4 illustrates an exemplary image segmentation system 100 for segmenting 3D images based on at least one CNN model, according to some embodiments of the present disclosure. As shown in FIG. 4, image segmentation system 100 may include components for performing two stages, a training stage and a segmentation stage. To perform the training stage, image segmentation system 100 may include a training image database 101 and a CNN model training unit 102. To perform the segmentation stage, image segmentation system 100 may include a CNN model-based image segmentation unit 103 and a medical image database 104. In some embodiments, image segmentation system 100 may include more or less of the components shown in FIG. 4. For example, when a CNN model for image segmentation is pre-trained and provided, image segmentation system 100 may only include segmentation unit 103 and medical image database 104. Image segmentation system 100 may optionally include a network 105. In some embodiments, network 105 may be replaced by wired data communication systems or devices.

In some embodiments, the various components of image segmentation system 100 may be located remotely from each other or in different spaces, and be connected through network 105 as shown in FIG. 4. In some alternative embodiments, certain components of image segmentation system 100 may be located on the same site or inside one device. For example, training image database 101 may be located on site with CNN model training unit 102, or be part of CNN model training unit 102. As another example, CNN model training unit 102 and segmentation unit 103 may be inside the same computer or processing device.

As shown in FIG. 4, CNN model training unit 102 may communicate with training image database 101 to receive one or more sets of training images. The sets of training images stored in training image database 101 may be obtained from a medical image database, for example, a medical image database containing previously acquired medical images during radiotherapy treatment sessions. Each set of training images may include a 3D image and its corresponding 3D ground truth label map that associates an anatomical structure to each of the voxels of the 3D image. The 3D image may be selectively divided to one or more sequential stacks of adjacent 2D images. The 3D ground truth label map may be divided to sequential 2D ground truth label maps, respectively corresponding to the sequential stacks of adjacent 2D images, and pixels of the 2D ground truth label maps are associated with known anatomical structures. The number of adjacent 2D images in each stack may be determined based on various factors, such as the size of the 3D image, a specific framework of the CNN model, the relationship between the anatomical structures in the adjacent 2D images along an axis orthogonal to the 2D image, and/or the application of the segmentation.

In some embodiments, a stack of adjacent 2D images includes an odd number of images, such as 3, 5, 7, or any suitable odd number. In such instances, the ground truth label map provides a known anatomical structure label for each pixel of the middle image of the stack. In other embodiments, a stack of adjacent 2D images includes an even number of images, such as 2, 4, 6, or any suitable even number. In such instances, the ground truth label map provides a known anatomical structure label for each pixel of one of the two middle images of the stack.

Consistent with the disclosed embodiments, the training images may be acquired using various imaging modalities, including MRI, functional MRI (e.g., fMRI, DCE-MRI and diffusion MRI), CT, CBCT, Spiral CT, PET, SPECT, X-ray, optical tomography, fluorescence imaging, ultrasound imaging, and radiotherapy portal imaging, etc. In some embodiments, the training data may be collected from an Oncology Information System. For example, the training images may be acquired by image acquisition device 140.

CNN model training unit 102 may use the training images received from training image database 101 to train a CNN model for performing image segmentation of new 3D images. CNN model training unit 102 may include a processor and a non-transitory computer-readable medium (discussed in detail in connection with FIG. 5). The processor may conduct the training by performing instructions of a training process stored in the computer-readable medium. CNN model training unit 102 may additionally include input and output interfaces (discussed in detail in connection with FIG. 5) to communicate with training image database 101, network 105, and/or a user interface (not shown). The user interface may be used for selecting sets of training images, adjusting one or more parameters of the training process (e.g., the number of adjacent image slices in each stack), selecting or modifying a framework of a CNN model, and/or manually or semi-automatically segmenting an image for training. Examples of the training process are described in detail with reference to FIG. 6 further below.

Figure 5:
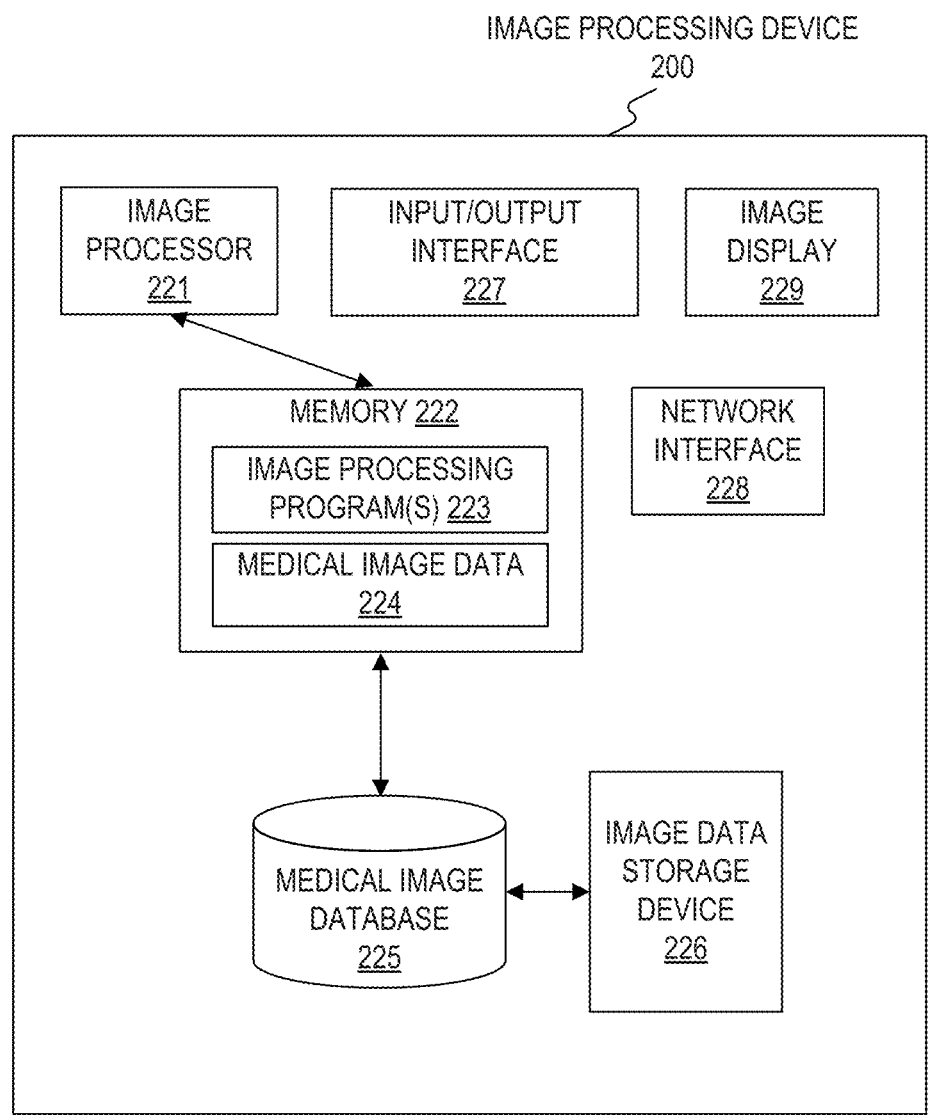
FIG. 5 illustrates an exemplary image processing device for segmenting 3D images, according to some embodiments of the present disclosure.
Figure 6:
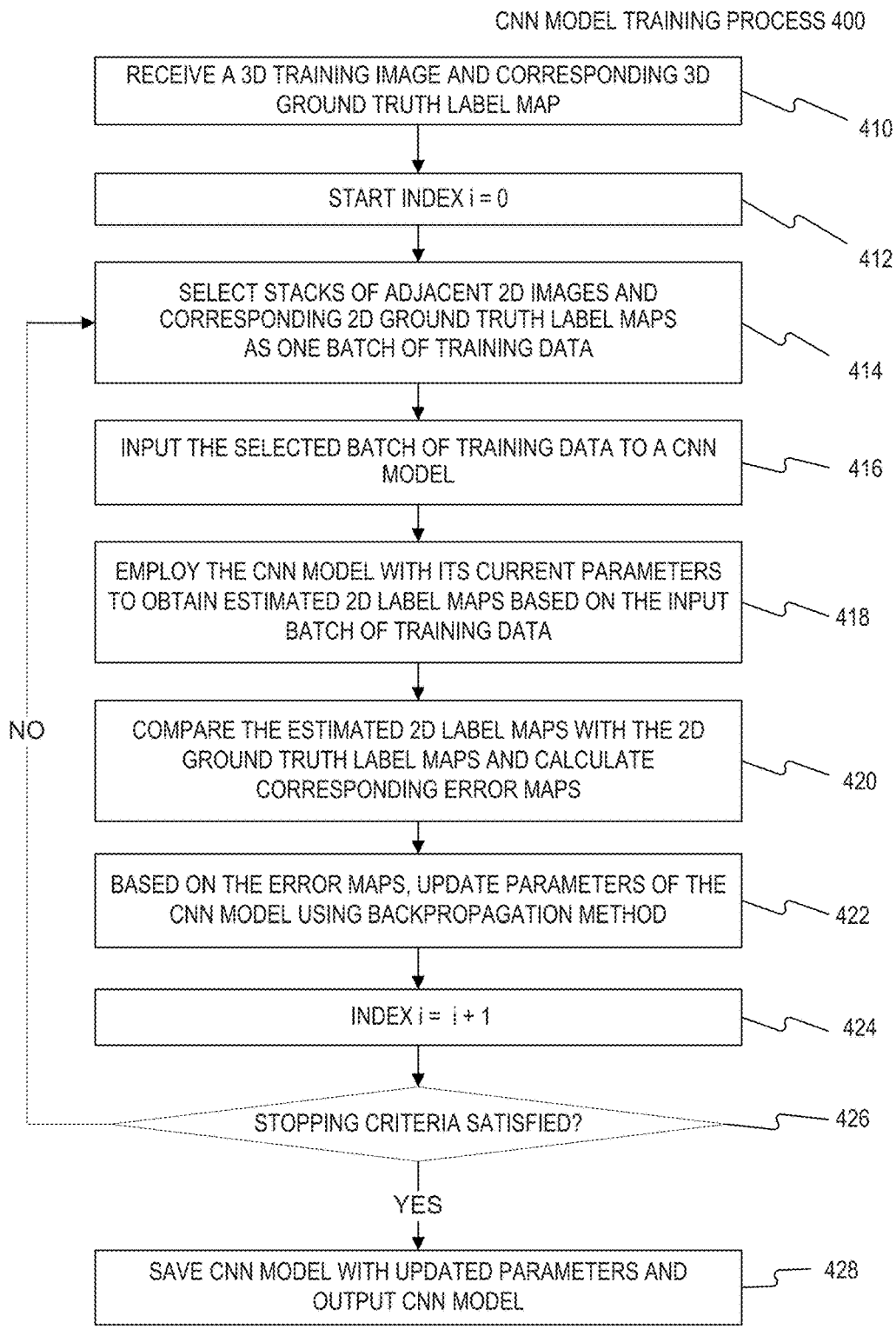
FIG. 6 is a flowchart illustrating an exemplary training process for training a CNN model, according to some embodiments of the present disclosure.

Consistent with some embodiments, CNN model training unit 102 may be implemented with hardware (e.g., as disclosed in FIG. 5) specially programmed by software that performs the training process (e.g., as disclosed in FIG. 6).

Segmentation unit 103 may receive at least one trained CNN model from CNN model training unit 102. Segmentation unit 103 may include a processor and a non-transitory computer-readable medium (discussed in detail in connection with FIG. 5). The processor may conduct the segmentation of a 3D image by performing instructions of an image segmentation process stored in the medium. Segmentation unit 103 may additionally include input and output interfaces (discussed in detail in connection with FIG. 5) to communicate with medical image database 104, network 105, and/or a user interface (not shown). The user interface may be used for selecting a 3D image to be segmented, initiating the segmentation process, displaying the segmented 3D image or a 3D label map, and/or performing further analysis based on the segmented image or the 3D label map. Examples of the image segmentation process are described in detail with reference to FIGS. 7A-8B further below.

Figure 7A:
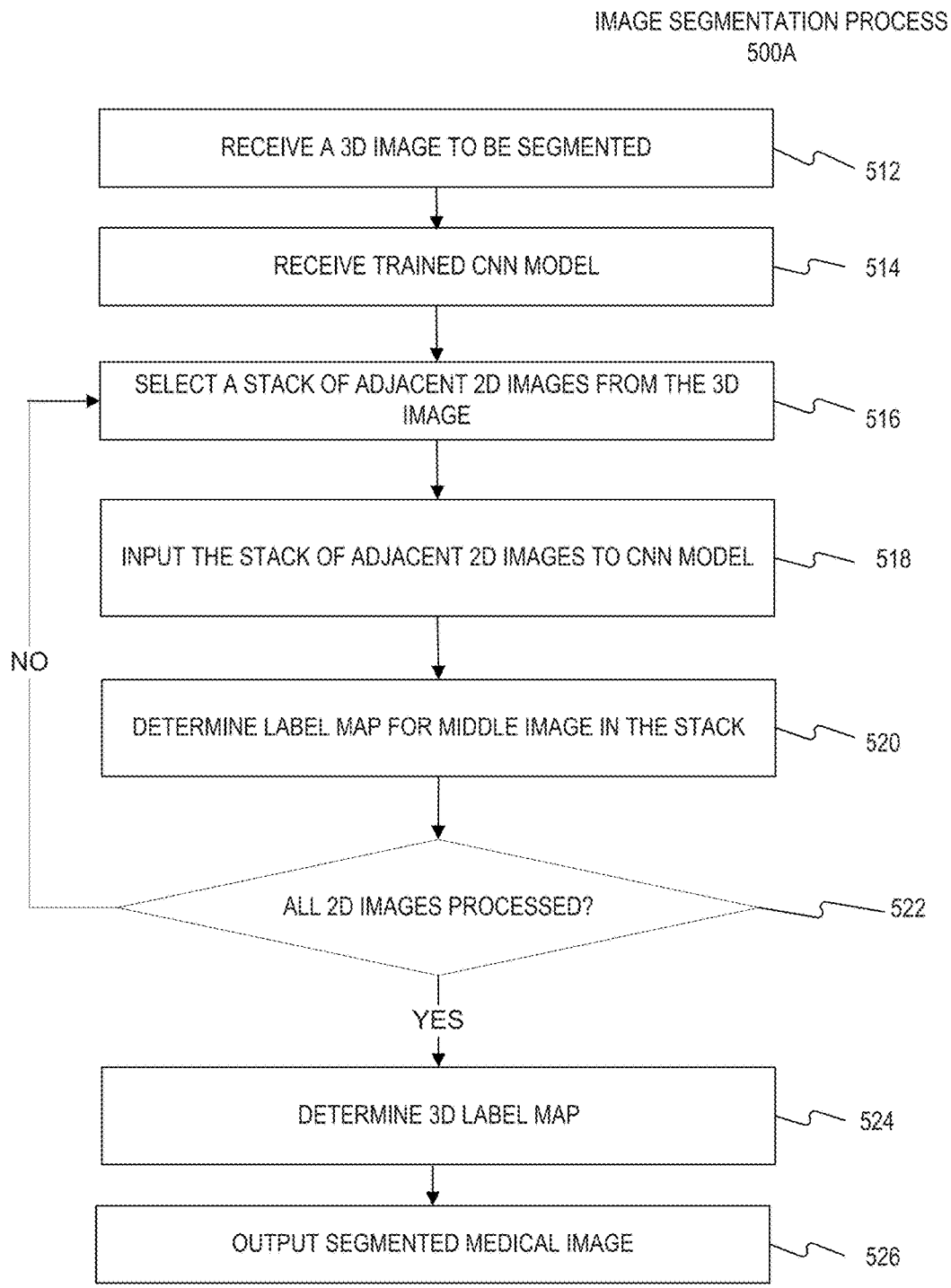
FIG. 7A is a flowchart illustrating an exemplary image segmentation process using one trained CNN model obtained through the process of FIG. 6, according to some embodiments of the present disclosure.
Figure 7B:
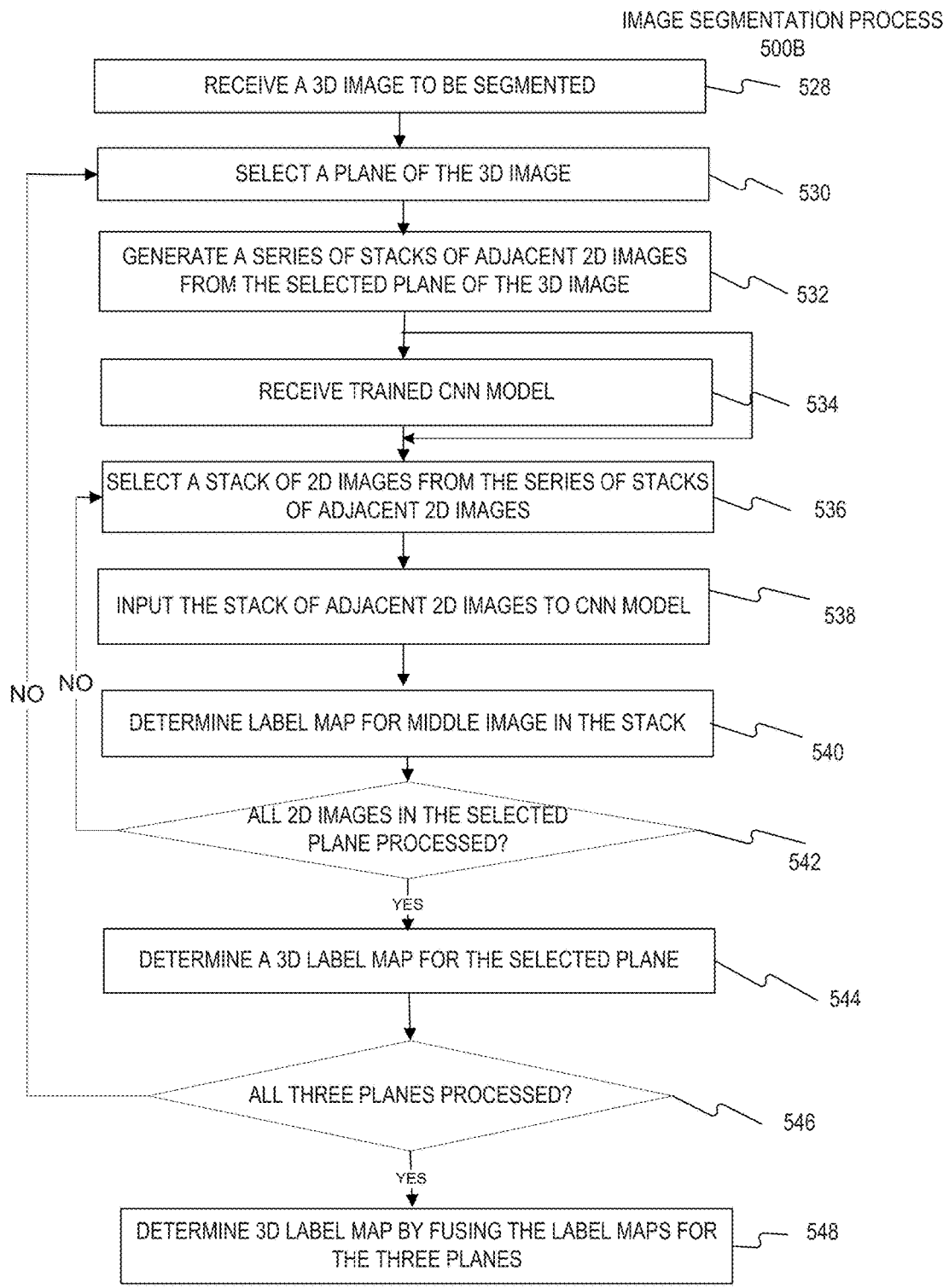
FIG. 7B is a flowchart illustrating another exemplary image segmentation process using the at least one trained CNN model obtained through the process of FIG. 6, according to some embodiments of the present disclosure.

Consistent with some embodiments, segmentation unit 103 may be implemented with hardware (e.g., as disclosed in FIG. 5) specially programmed by software that performs an image segmentation process (e.g., as disclosed in FIGS. 7A and 7B).

Segmentation unit 103 may communicate with medical image database 104 to receive one or more 3D images. The 3D images stored in medical image database 104 may be obtained from a medical image database, which contains 2D and/or 3D images of radiotherapy treatment sessions, for example. As described herein, the 3D images may be reconstructed from 2D projection images acquired by medical imaging devices, such as image acquisition device 140. These 3D images are typically not segmented yet.

Segmentation unit 103 may use at least one trained CNN model received from CNN model training unit 102 to predict the anatomical structure each voxel of a 3D image represents. When the image segmentation is completed, segmentation unit 103 may output a 3D label map, associating each voxel of the 3D image to an anatomical structure. The 3D label map may be displayed in the user interface, and/or stored in medical image database 104 for further use in treatment planning. In some embodiments, the segmented image may be automatically stored in training image database 101 and become a training image.

Consistent with the disclosed embodiments, the 3D images to be segmented may be acquired using various imaging modalities, including MRI, functional MRI (e.g., fMRI, DCE-MRI and diffusion MRI), CT, CBCT, Spiral CT, PET, SPECT, X-ray, optical tomography, fluorescence imaging, ultrasound imaging, and radiotherapy portal imaging, etc. In some embodiments, medical image database 104 may be an integrated part of segmentation unit 103, or located on the same site of segmentation unit 103, such as in a radiotherapy treatment room.

Network 105 may provide connections between any of the above described components in image segmentation system 100. For example, network 105 may be a local area network (LAN), a wireless network, a cloud computing environment (e.g., software as a service, platform as a service, infrastructure as a service), a client-server, a wide area network (WAN), etc.

CNN Model-Based Image Processing Device

FIG. 5 illustrates an exemplary image processing device 200, according to some embodiments of the present disclosure. Image processing device 200 may be an embodiment of CNN model training unit 102, or segmentation unit 103, or the combination of the two. As would be appreciated by those skilled in the art, in some embodiments, image processing device 200 may be a special-purpose computer, or a general-purpose computer. For example, image processing device 200 may be a computer custom-built for hospitals to perform image acquisition and image processing tasks.

As shown in FIG. 5, image processing device 200 may include an image processor 221, a memory 222, a medical image database 225, an image data storage device 226, an input/output interface 227, a network interface 228, and an image display 229.

Image processor 221 may be one or more general-purpose processing devices, such as a microprocessor, central processing unit (CPU), graphics processing unit (GPU), etc. Image processor 221 may also be one or more special-purpose processing devices, such as an application specific integrated circuit (ASIC), a field programmable gate array (FPGA), a digital signal processor (DSP), a System on a Chip (SoC), etc.

Image processor 221 may be communicatively coupled to memory 222 and configured to execute the computer-executable instructions stored thereon. Memory 222 may be a non-transitory computer-readable medium, such as a read-only memory (ROM), a random access memory (RAM), a phase-change random access memory (PRAM), a static random access memory (SRAM), a dynamic random access memory (DRAM), an electrically erasable programmable read-only memory (EEPROM), other types of random access memories (RAMs), a flash disk or other forms of flash memory, a cache, a register, a static memory, a compact disc read-only memory (CD-ROM), a digital versatile disc (DVD) or other optical storage, a cassette tape or other magnetic storage devices, or any other non-transitory medium that may be used to store information or instructions capable of being accessed by a computer device, etc.

In some embodiments, memory 222 may store computer-executable instructions, such as one or more image processing programs 223, as well as data used or generated while executing the computer programs, such as medical image data 224. Image processor 221 may execute image processing programs 223 to implement functionalities of CNN model training unit 102 and/or segmentation unit 103. Image processor 221 may also send and/or receive medical image data 224 from memory 222. For example, image processor 221 may receive training image data or medical image data stored in memory 222. Image processor 221 may also generate intermediate data such as updated parameters of the CNN model, and/or intermediate 2D and/or 3D segmented images or label maps, and send them to memory 222.

Image processing device 200 may optionally include a medical image database 225, which include one or both of training image database 101 and medical image database 104. One skilled in the art would appreciate that medical image database 225 may include a plurality of devices located either in a central or distributed manner. Image processor 221 may communicate with medical image database 225 to read images into memory 222 or store segmented images from memory 222 to medical image database 225.

Image data storage device 226 may be an additional storage available to store data associated with image processing tasks performed by image processor 221. In some embodiments, image data storage device 226 may include a non-transitory machine-readable or computer-readable storage medium. While the machine-readable or computer-readable storage medium in an embodiment may be a single medium, the term "machine-readable storage medium" or "computer-readable storage medium" should be understood as including a single medium or multiple media (e.g., a centralized or distributed database, and/or associated caches and servers) that store the one or more sets of computer-executable instructions or data. The term "machine-readable storage medium" or "computer-readable storage medium" shall also be understood as including any medium that is capable of storing or encoding a set of instructions for execution by the machine or computer and that cause the machine or computer to perform any one or more of the methods of the present disclosure. The term "machine-readable storage medium" or "computer-readable storage medium" shall accordingly be taken to include, but not be limited to, solid-state memories, optical, and magnetic medium.

Input/output interface 227 may be configured to allow data to be received and/or transmitted by image processing device 200. Input/output interface 227 may include one or more digital and/or analog communication devices that allow image processing device 200 to communicate with a user or other machines and devices. For example, input/output interface 227 may include a keyboard and a mouse for the user to provide input into image processing device 200.

Network interface 228 may include a network adaptor, a cable connector, a serial connector, a USB connector, a parallel connector, a high-speed data transmission adaptor, such as fiber, USB 3.0, thunderbolt, and the like, a wireless network adaptor, such as a WiFi adaptor, a telecommunication (3G, 4G/LTE and the like) adaptor, etc. Image processing device 200 may be connected to network 105 through network interface 228. Image display 229 may be any display device suitable for displaying the medical images. For example, image display 229 may be an LCD, CRT, or LED display.

Exemplary CNN Model Training Processes

Exemplary training processes performed by the image segmentation methods, systems, and devices of the present disclosure are described in detail below with references to FIG. 6.

FIG. 6 is a flowchart illustrating an exemplary training process 400 for training a CNN model, according to some embodiments of the present disclosure. In some embodiments, training process 400 may be performed by CNN model training unit 102.

Training process 400 may start when CNN model training unit 102 receives a set of training images (Step 410). As described above, the set of training images may include a 3D training image and its corresponding 3D ground truth label map. For example, a 3D training image may show the pelvic area, the head area, the cardiac area, the liver area, or another anatomical area of a patient. In some embodiments, the training image may be of a same or similar region of interest as the image to be segmented.

As shown in FIG. 6, to set the starting point of an iteration for training the CNN model, in Step 412, an index for tracking the number of iterations is set to be zero, for example. In Step 414, CNN model training unit 102 may select, e.g., randomly, one or more stacks of adjacent 2D images from the 3D training image(s) and the corresponding 2D ground truth label maps, and use the selected images and maps collectively as one batch of training data to train a CNN model. For example, a series of sequential stacks of adjacent 2D images along an anatomical plane may be obtained from a 3D training image. The sequential stacks may have one or more overlapping images, such that the middle images of the series of stacks may substantially constitute the whole 3D training image. Additionally, CNN model training unit 102 may receive a corresponding 2D ground truth label map of the middle image of each of the selected stacks of adjacent 2D images. For example, as described above, the 3D ground truth label map may be divided into a series of sequential 2D ground truth label maps, respectively corresponding to the sequential stacks of adjacent 2D images. The 2D label map provides a known anatomical structure label for each pixel of the middle image of the selected stack of adjacent 2D images. Therefore, each pixel of the 2D label map is associated with either the background or one of the known anatomical structures contained in the selected stack of adjacent 2D images. As described above, the stack of adjacent 2D images contain dependent structure information between them along an axis orthogonal to the anatomical plane.

In some embodiments, the one or more stacks of adjacent 2D images selected in Step 414 may be along a selected plane from the three anatomical planes, such as the axial plane, sagittal plane, or coronal plane. In such instances, process 400 may output a trained CNN model for this selected plane, e.g., for segmenting a 3D image sliced along this selected plane. In some embodiments, process 400 may be repeated to output three different CNN models trained for segmenting 3D images slices along the three anatomical planes respectively.

In other embodiments, the one or more stacks of adjacent 2D images selected in Step 414 may be along two or more selected anatomical planes. Process 400 may be performed to output one trained CNN model that can be used for segmenting images along any one of the two or more selected anatomical planes. In other embodiments, the one or more stacks of adjacent 2D images selected in Step 414 may be along any of the three anatomical planes, e.g., at least one stack of adjacent 2D images is selected for each anatomical plane. Process 400 may be performed to obtain one trained CNN model that can be used for segmenting images along any of the three anatomical planes. In such instances, the output CNN model is trained using combined stacks of adjacent 2D images along all three anatomical planes.

Steps 414 through 422 may be performed iteratively for more than one times to train a CNN model until the CNN model outputs satisfactory estimated 2D and/or 3D label maps. The number of iterations may be determined by various stopping criteria. In some embodiments, a maximum number of iterations may be used. At each iteration, a new batch of training data may be randomly selected and used for training the CNN model until the maximum number of iterations is reached. Additionally or alternatively, an expected accuracy may be predetermined before training the CNN model. The batch selection and updating of the CNN model parameters are performed repeatedly until the accuracy of the output 2D and/or 3D label maps meets the expected accuracy.

To set the starting point of the iteration for training the CNN model, in Step 412, as shown in FIG. 6, an index for tracking the number of iterations is set to be zero, for example. In Step 414, a batch of training data is selected, e.g., randomly, as described above. In Step 416, CNN model training unit 102 may input the selected batch of training data to a CNN model for training. In Step 418, CNN model training unit 102 may employ the CNN model with its current parameters, e.g., weights of the filters, to obtain estimated 2D label maps corresponding to the input stacks of adjacent 2D images.

In Step 420, CNN model training unit 102 may compare the estimated 2D label maps with the 2D ground truth label maps selected in step 412, and calculate corresponding error maps. In Step 422, CNN model training unit 102 may determine or update parameters of one or more layers of the CNN model based on the obtained error maps. For example, a backpropagation method may be used to determine or update the parameters of one or more layers of the CNN model based on the difference between the 2D ground truth label maps and the output estimated 2D label maps. The backpropagation method may optimize the parameters by minimizing a loss function with respect to all the parameters in the CNN model, for example.

In Step 424, CNN model training unit 102 may increase the index for tracking the number of iteration by one. In Step 426, CNN model training unit 102 may determine whether the criteria for stopping the iteration is met. As described above, in some embodiments, CNN model training unit 102 may determine whether index is equal to or greater than a predetermined maximum number of index. Additionally or alternatively, CNN model training unit 102 may determine whether the accuracy of the estimated 2D label maps meets or extends the expected accuracy, e.g., by determining whether the loss function is smaller than a threshold. If CNN model training unit 102 determines that the criteria for stopping the iteration has not been met (Step 426: No), training process 400 may return to Step 414 to once again select a new batch of training data to train the CNN model. If CNN model training unit 102 determines that the criteria for stopping the iteration has been met (Step 426: Yes), training process 400 may proceed to Step 428, which may save the CNN model with the updated parameters and/or output the trained CNN model.

In some embodiments, more than one training image datasets (e.g., more than one 3D training images and the corresponding 3D ground truth label maps) are used for training the CNN model. In such instances, when selecting a batch of training data in Step 414, one can first randomly select one or more 3D training image datasets, and then randomly select one or more stacks of adjacent 2D images and the corresponding 2D ground truth label maps from each of the selected 3D image datasets. Steps 414-426 may then proceed similarly as described above.

Exemplary CNN Model-Based Image Segmentation Processes

Exemplary image segmentation processes performed by the image segmentation methods, systems, and devices of the present disclosure are described in detail below with references to FIGS. 7A-8B.

FIG. 7A is a flowchart illustrating an exemplary image segmentation process 500A using the trained CNN model obtained through the process of FIG. 6, according to some embodiments of the present disclosure. Image segmentation process 500A may be performed by segmentation unit 103. As shown in FIG. 7A, image segmentation process 500A may start when segmentation unit 103 receives a 3D image to be segmented (Step 512). The 3D image may be a 3D medical image, e.g., a 3D medical image showing the pelvic area, the head area, the cardiac area, the liver area, or another anatomical area of a patient. In Step 514, segmentation unit 103 may receive a trained CNN model.

In Step 516, segmentation unit 103 may select a stack of adjacent 2D images from a series of stacks of adjacent 2D images generated from the 3D image. As described above, the series of stacks of adjacent 2D images may be sequential and have one or more overlapping images, such that the middle images of the stacks together substantially constitute the whole 3D image. In Step 518, a stack in the series is input to the trained CNN model. In Step 520, segmentation unit 103 may determine a 2D output label map of the middle image in the stack. In Step 522, segmentation unit 103 may determine whether all stacks of adjacent 2D images have been input to the trained CNN model. If segmentation unit 103 determines that not all stacks of adjacent 2D images generated from the 3D image are used (Step 522: No), image segmentation process 500A may return to Step 516. If segmentation unit 103 determines that all stacks of adjacent 2D images generated from the 3D image are used (Step 522: Yes), image segmentation process 500A may proceed to Step 524.

In Step 524, a 3D label map may be determined based on the 2D label maps of the middle images of the stacks of 2D adjacent images. For example, a 3D label map may be obtained by aggregating the 2D label maps of the middle images according to the sequence of the middle images along an axis orthogonal to the anatomical plane of the stacks of 2D images. Optionally, image segmentation process 500A may include Step 526. In Step 526, segmentation unit 103 outputs a segmented 3D image. For example, segmentation unit 103 may display the segmented 3D image or the 3D label map for further analysis or observation.

FIG. 7B is a flowchart illustrating another exemplary image segmentation process 500B using one or more trained CNN models obtained through the process of FIG. 6, according to some embodiments of the present disclosure. Image segmentation process 500B may be performed by segmentation unit 103. Image segmentation process 500B may include similar steps as those in image segmentation process 500A. Image segmentation process 500B may start when segmentation unit 103 receives a 3D image to be segmented (Step 528). The 3D image may be a 3D medical image, e.g., a 3D medical image showing the pelvic area, the head area, the cardiac area, the liver area, or another anatomical area of a patient.

In Step 530, segmentation unit 103 may select a plane of the 3D image received in Step 528 for obtaining stacks of adjacent 2D images. For example, if the 3D image is a 3D medical image, Step 530 may select one among three anatomical planes, such as the axial plane, sagittal plane, and coronal plane. In Step 532, segmentation unit 103 may generate a series of stacks of adjacent 2D images from the 3D image along the selected anatomical plane.

In Step 534, segmentation unit 103 may receive one or more trained CNN models. In some embodiments, the received trained CNN model may have been trained with stacks of adjacent 2D images along the same anatomical plane as that selected in Step 530. In such instances, when the selected plane in Step 530 is changed, another trained CNN model corresponding to the anatomical plane may be received and used for performing image segmentation. In other embodiments, the trained CNN model may have been trained with stacks of adjacent 2D images along all three anatomical planes of the 3D image. In such instances, the same trained CNN model can be used for performing image segmentation of stacks of adjacent 2D images along any selected anatomical plane or any stacks of adjacent 2D images combined from the three anatomical planes.

Steps 536-542 are similar to Steps 516-522 of image segmentation process 500A. In Step 536, segmentation unit 103 may select a stack of adjacent 2D images from the series of stacks of adjacent 2D images generated in Step 532. In Step 538, a stack in the series is input to the trained CNN model. In Step 540, segmentation unit 103 may determine a 2D output label map of the middle image in the stack. In Step 542, segmentation unit 103 may determine whether all stacks of adjacent 2D images have been input to the trained CNN model. If segmentation unit 103 determines that not all stacks of adjacent 2D images generated from the 3D image along the selected anatomical plane are used (Step 542: No), image segmentation process 500B may go back to Step 536. If segmentation unit 103 determines that all stacks of adjacent 2D images generated from the 3D image along the selected anatomical plane are used (Step 542: Yes), image segmentation process 500B may proceed to Step 544.

In Step 544, a 3D label map may be determined based on the 2D label maps of the middle images of the stacks of 2D adjacent images. For example, a 3D label map may be obtained by aggregating the 2D label maps of the middle images according to the sequence of the middle images along an axis orthogonal to the anatomical plane of the stacks of 2D images. Additionally, image segmentation process 500B may include Step 546. In Step 546, segmentation unit 103 determines whether all three series of stacks of adjacent 2D images along all three planes (e.g., the axial plane, sagittal plane, and coronal plane) have been used for segmenting the 3D image. If segmentation unit 103 determines that not all three series of stacks of 2D images corresponding to all three planes have been used (Step 546: No), image segmentation process 500B may go back to Step 530 to select another anatomical plane. If segmentation unit 103 determines that all three series of stacks of 2D images corresponding to all three planes have been used (Step 546: Yes), image segmentation process 500B may proceed to Step 548.

In Step 548, segmentation unit 103 determines a final 3D label map. The final 3D label map may be determined by fusing three 3D label maps determined for three anatomical planes. In some embodiments, the value of a voxel of the fused 3D label map may be determined by majority vote. For example, if two out of the three 3D label maps label a voxel of the 3D image as an anatomical structure, the corresponding voxel of the fused 3D label map is determined to be associated with the same anatomical structure. In other embodiments, a voxel of the fused 3D label map is determined based on the maximum likelihood or probability estimated for the corresponding voxels in the three 3D label maps. For example, if a first 3D label map determines that a voxel represents bladder with a probability of 0.5, a second 3D label map determines that the voxel represents prostate with a probability of 0.4, and a third 3D label map determines that the voxel represents rectum with a probability of 0.2, the voxel is then labeled in the fused 3D label map as representing bladder. As described herein, any suitable methods may be used to fuse the three 3D label maps determined in image segmentation process 500B.

As described above, a CNN model may be trained using stacks of adjacent 2D images along three anatomical planes. In such instances, when image segmentation process 500B performs Step 530 to select a second anatomical plane and Step 532 to generate a series of stacks of adjacent 2D images along the selected anatomical plane, image segmentation process 500B may skip Step 534 and proceed to Step 536. Image segmentation process 500B for segmenting a 3D medical image is further illustrated in FIGS. 8A and 8B.

Figure 8A:
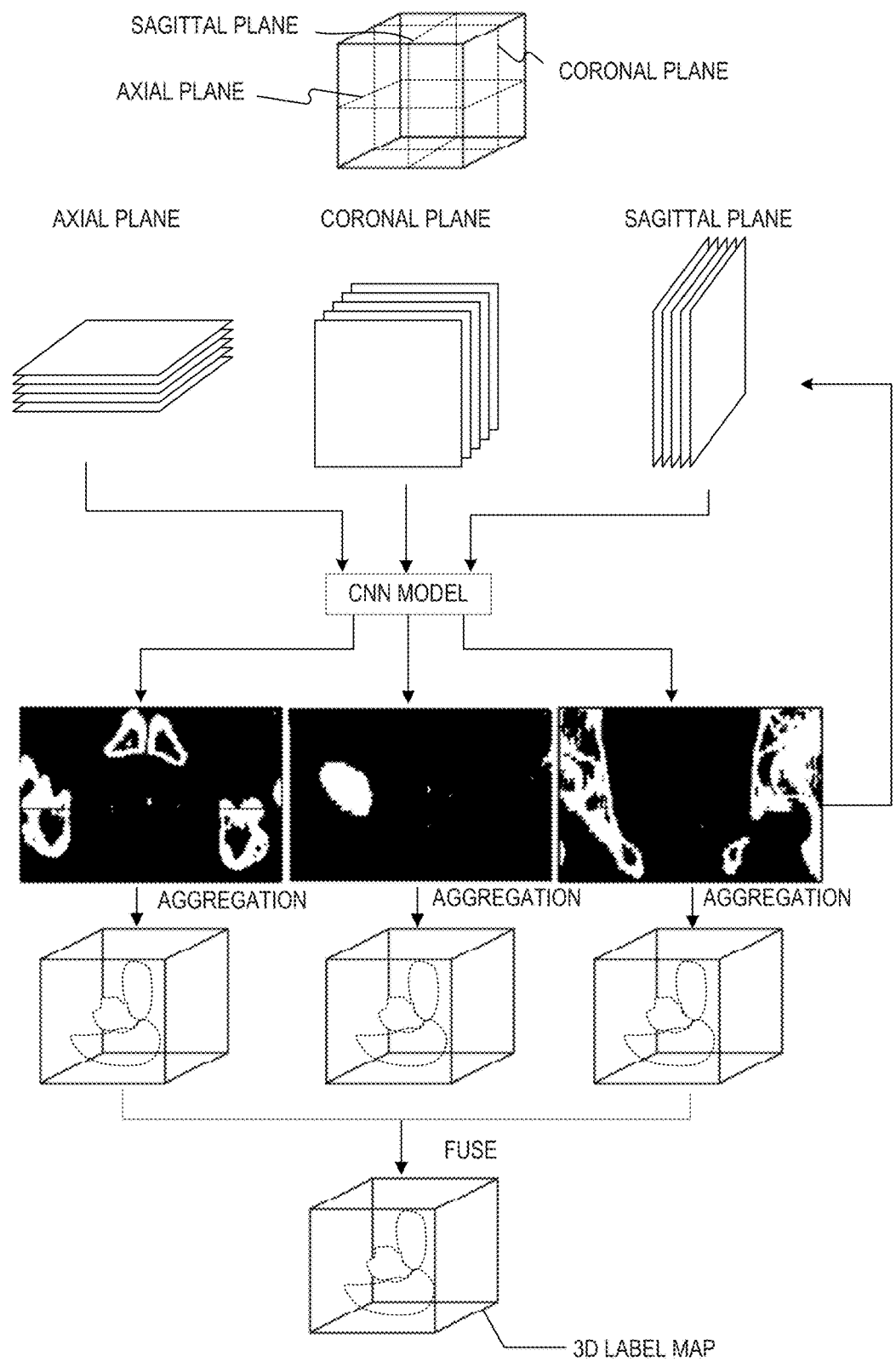
FIG. 8A illustrates a first exemplary image segmentation process of a 3D medical image, according to some embodiments of the present disclosure.

As shown in FIG. 8A, segmentation unit 103 may receive a CNN model that has been trained using stacks of adjacent 2D images along more than one anatomical planes (e.g., the axial plane, the sagittal plane, and the coronal plane). Three series of stacks of adjacent 2D images generated from the 3D medical image to be segmented along the three anatomical planes may independently input to the trained CNN model to obtain 2D label maps. Alternatively, the three series of stacks of adjacent 2D images along three anatomical planes may be combined, e.g., stacked one by one, and input to the same trained CNN model. As described above, the 2D label maps of the middle images of the series of stacks of adjacent 2D images along each anatomical plane can be aggregated, e.g., stacked along an axis orthogonal to the anatomical plane, to obtain a 3D label map. Accordingly, as shown in FIG. 8A, three 3D label maps can be obtained of the 3D image based on the three series of stacks of adjacent images corresponding to three different anatomical planes. As described above, the three 3D label maps can be fused to generate a final 3D label map of the 3D medical image.

Figure 8B:
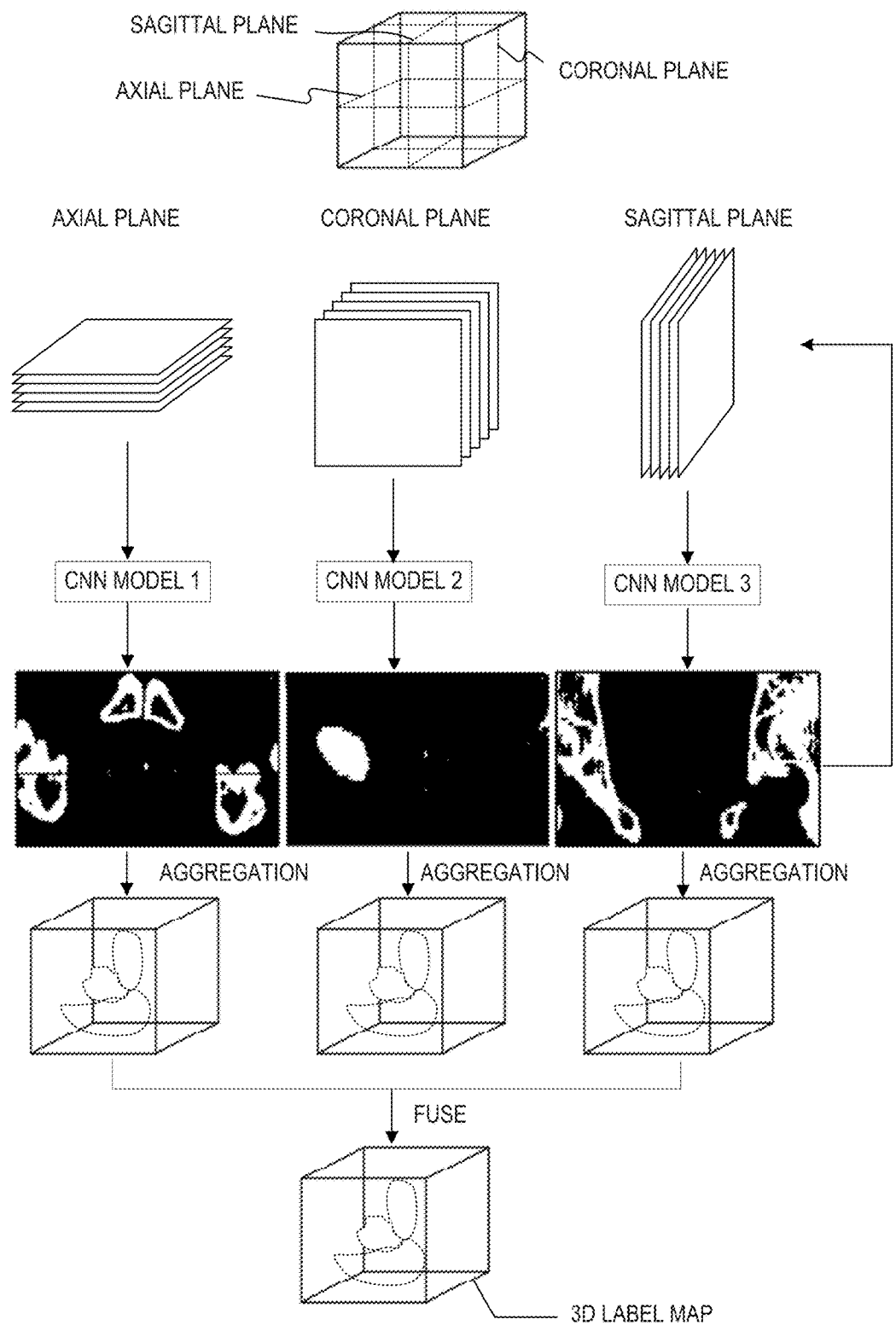
FIG. 8B illustrates a second exemplary image segmentation process of a 3D medical image, according to some embodiments of the present disclosure.

Alternatively, as shown in FIG. 8B, segmentation unit 103 may receive three CNN models, each trained using stacks of adjacent 2D images along one of the three anatomical planes (e.g., axial plane, the coronal plane, or the sagittal plane) respectively. In such instances, segmentation unit 103 may select each anatomical plane and generate a series of stacks of adjacent 2D images from the 3D medical image along each anatomical plane. Each generated series of stacks of adjacent 2D images along one of the three anatomical planes may be independently input to a separate CNN model trained with stacks of 2D images of the corresponding anatomical plane to obtain 2D label maps. For example, as shown in FIG. 8B, three CNN models, CNN model 1, CNN model 2, and CNN model 3, are used separately for processing stacks of adjacent 2D images obtained along the axial plane, the coronal plane, and the sagittal plane respectively. Similarly, the 2D label maps of the middle images of the stacks of adjacent 2D images along each anatomical plane can be aggregated, e.g., stacked along an axis orthogonal to the anatomical plane, to obtain a 3D label map. Thus, three 3D label maps can be obtained based on three series of stacks of adjacent images of three different anatomical planes. As described above, the three 3D label maps may be fused to generate a final 3D label map of the 3D medical image.

As described herein, in some embodiments, segmentation unit 103 may receive two or three CNN models, each trained using stacks of adjacent 2D images along one of the three anatomical planes. In such instances, two or three 3D label maps may be obtained based on two or three series of stacks of adjacent 2D images obtained from the 3D medical image along selected two or three different anatomical planes. Similarly, the two or three 3D label maps may be fused to generate a final 3D label map of the 3D medical image.

Various operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer-readable storage medium may cause a machine to perform the functions or operations described, and includes any mechanism that stores information in a form accessible by a machine (e.g., computing device, electronic system, and the like), such as recordable/non-recordable medium (e.g., read only memory (ROM), random access memory (RAM), magnetic disk storage medium, optical storage medium, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present invention also relates to a system for performing the operations herein. This system may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of medium suitable for storing electronic instructions, each coupled to a computer system bus.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be interpreted as open ended, such that an item or items following any one of these words is not meant to be an exhaustive listing of the item or items, or meant to be limited to only the listed item or items. And the singular forms "a," "an," and "the" are intended to include plural references, unless the context clearly dictates otherwise.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer-implemented method for training a machine learning model to segment a three-dimensional medical image to perform radiotherapy treatment planning, the method comprising:
   receiving, by a processor, the three-dimensional medical image to be segmented;
   selecting a first stack of two-dimensional images corresponding to a first plane of the three-dimensional medical image;
   extracting one or more features of the first stack of two-dimensional images;
   generating a training label map for an image in the first stack of two-dimensional images based on the extracted one or more features; and
   training the machine learning model to generate a new label map for a subsequently received three-dimensional medical image based on a comparison of the generated training label map with a ground truth label map corresponding to the first stack of two-dimensional images, wherein a radiotherapy treatment plan is generated based on the trained machine learning model.

2. The method of claim 1, further comprising:
   selecting a second stack of two-dimensional images from a second plane of the three-dimensional medical image; and
   generating a training label map for an image in the second stack of two-dimensional images.

3. The method of claim 2, further comprising:
   combining the first stack of two-dimensional image and the second stack of two-dimensional images; and
   segmenting the combined stack of two-dimensional images using the machine learning model.

4. The method of claim 2, wherein at least one of the two-dimensional images in the first stack are adjacent or the first and second stacks are adjacent.

5. The method of claim 1 further comprising computing an error map based on the comparison of the generated training label map with the ground truth label map.

6. The method of claim 5 further comprising updating a parameter of the machine learning model based on the error map.

7. The method of claim 1, wherein the machine learning model comprises a deep convolutional neural network model.

8. The method of claim 1 further comprising determining whether a stopping criterion has been satisfied.

9. The method of claim 8 further comprising:
providing the machine learning model for application to the subsequently received three-dimensional medical image in response to determining that the stopping criterion has been satisfied; and
selecting another stack of two-dimensional images in response to determining that the stopping criterion has not been satisfied.

10. The method of claim 9, wherein the first stack and the another stack have at least one overlapping image.

11. The method of claim 8, wherein the stopping criterion includes at least one of a maximum number of iterations, a specified accuracy.

12. The method of claim 8, wherein determining whether the stopping criterion has been satisfied comprises determining whether a loss function is smaller than a threshold.

13. A non-transitory computer readable medium comprising non-transitory computer readable instructions for training a machine learning model to segment a three-dimensional medical image to perform radiotherapy treatment planning, the non-transitory computer readable instructions comprising instructions for:
receiving, by a processor, the three-dimensional medical image to be segmented;
selecting a first stack of two-dimensional images corresponding to a first plane of the three-dimensional medical image;
extracting one or more features of the first stack of two-dimensional images;
generating a training label map for an image in the first stack of two-dimensional images based on the extracted one or more features; and
training the machine learning model to generate a new label map for a subsequently received three-dimensional medical image based on a comparison of the generated training label map with a ground truth label map corresponding to the first stack of two-dimensional images, wherein a radiotherapy treatment plan is generated based on the trained machine learning model.

14. The non-transitory computer readable medium of claim 13, further comprising instructions for:
selecting a second stack of two-dimensional images from a second plane of the three-dimensional medical image; and
generating a training label map for an image in the second stack of two-dimensional images.

15. The non-transitory computer readable medium of claim 14, further comprising instructions for:
combining the first stack of two-dimensional image and the second stack of two-dimensional images; and
segmenting the combined stack of two-dimensional images using the machine learning model.

16. The non-transitory computer readable medium of claim 14, wherein at least one of the two-dimensional images in the first stack are adjacent or the first and second stacks are adjacent.

17. The non-transitory computer readable medium of claim 13 further comprising instructions for determining whether a stopping criterion has been satisfied.

18. The non-transitory computer readable medium of claim 17 further comprising instructions for:
providing the machine learning model for application to the subsequently received three-dimensional medical image in response to determining that the stopping criterion has been satisfied; and
selecting another stack of two-dimensional images in response to determining that the stopping criterion has not been satisfied.

19. A system to train a machine learning model to segment a three-dimensional medical image to perform radiotherapy treatment planning, the system comprising:
at least one storage device configured to store a three-dimensional medical image; and
a processor configured to:
select a first stack of two-dimensional images corresponding to a first plane of the three-dimensional medical image;
extract one or more features of the first stack of two-dimensional images;
generate a training label map for an image in the first stack of two-dimensional images based on the extracted one or more features; and
train the machine learning model to generate a new label map for a subsequently received three-dimensional medical image based on a comparison of the generated training label map with a ground truth label map corresponding to the first stack of two-dimensional images, wherein a radiotherapy treatment plan is generated based on the trained machine learning model.

20. The image-guided radio therapy system of claim 19, wherein the machine learning model comprises a deep convolutional neural network model.

* * * * *